(12) United States Patent
Zhu et al.

(10) Patent No.: US 11,366,478 B2
(45) Date of Patent: Jun. 21, 2022

(54) AUTONOMOUS AUTOMOBILE GUIDANCE AND TRAJECTORY-TRACKING

(71) Applicant: Ohio University, Athens, OH (US)

(72) Inventors: Jianchao Zhu, Athens, OH (US); Yuanyan Chen, Logan, OH (US)

(73) Assignee: Ohio University, Athens, OH (US)

( * ) Notice: Subject to any disclaimer, the term of this patent is extended or adjusted under 35 U.S.C. 154(b) by 262 days.

(21) Appl. No.: 16/348,280

(22) PCT Filed: Nov. 13, 2017

(86) PCT No.: PCT/US2017/061319
§ 371 (c)(1),
(2) Date: May 8, 2019

(87) PCT Pub. No.: WO2018/089898
PCT Pub. Date: May 17, 2018

(65) Prior Publication Data
US 2019/0317516 A1 Oct. 17, 2019

Related U.S. Application Data

(60) Provisional application No. 62/484,543, filed on Apr. 12, 2017, provisional application No. 62/420,314, filed on Nov. 10, 2016.

(51) Int. Cl.
| | | |
|---|---|---|
| *G05D 1/02* | (2020.01) | |
| *B60W 40/103* | (2012.01) | |
| *B60W 40/114* | (2012.01) | |

(52) U.S. Cl.
CPC ......... *G05D 1/0223* (2013.01); *B60W 40/103* (2013.01); *B60W 40/114* (2013.01); *G05D 1/0219* (2013.01)

(58) Field of Classification Search
CPC . G05D 1/0223; G05D 1/0219; B60W 40/103; B60W 40/114
See application file for complete search history.

(56) References Cited

U.S. PATENT DOCUMENTS 9,058,036 B1 * 6/2015 Vian ................... G05B 23/0221
701/29
2011/0190972 A1 * 8/2011 Timmons ....................... 701/29
(Continued)

FOREIGN PATENT DOCUMENTS

| CN | 102139696 A | 8/2011 |
|---|---|---|
| CN | 104590051 A | 5/2015 |

OTHER PUBLICATIONS

PCT Office, Search Report and Written Opinion issued in PCT/US2017/61319 dated Feb. 2, 2018, 13 pages.
(Continued)

*Primary Examiner* — Russell Frejd
*Assistant Examiner* — Anthony M Gartrelle
(74) *Attorney, Agent, or Firm* — Wood Herron & Evans LLP

(57) ABSTRACT

Systems, methods, and computer program products for autonomous car-like ground vehicle guidance and trajectory tracking control. A multi-loop 3DOF trajectory linearization controller provides guidance to a vehicle having nonlinear rigid-body dynamics with nonlinear tire traction force, nonlinear drag forces and actuator dynamics. The controller may be based on a closed-loop PD-eigenvalue assignment and a singular perturbation (time-scale separation) theory for exponential stability, and controls the longitudinal velocity and steering angle simultaneously to follow a feasible guidance trajectory. A line-of-sight based pure-pursuit guidance controller may generate a 3DOF spatial trajectory that is provided to the 3DOF controller to enable target pursuit and path-following/trajectory-tracking. The resulting combina-
(Continued)

tion may provide a 3DOF motion control system with integrated simultaneous steering and speed control for automobile and car-like mobile robot target pursuit and trajectory-tracking.

19 Claims, 20 Drawing Sheets

(56) References Cited

U.S. PATENT DOCUMENTS

| | | | |
|---|---|---|---|
| 2011/0251748 A1 | 10/2011 | Moran et al. | |
| 2015/0120106 A1* | 4/2015 | Yu | B60W 30/02 |
| 2016/0185344 A1* | 6/2016 | Moran | B60W 30/02 |

OTHER PUBLICATIONS

Chinese Patent Office, Office Action issued in CN 201780082135.9 dated Oct. 9, 2021.

* cited by examiner

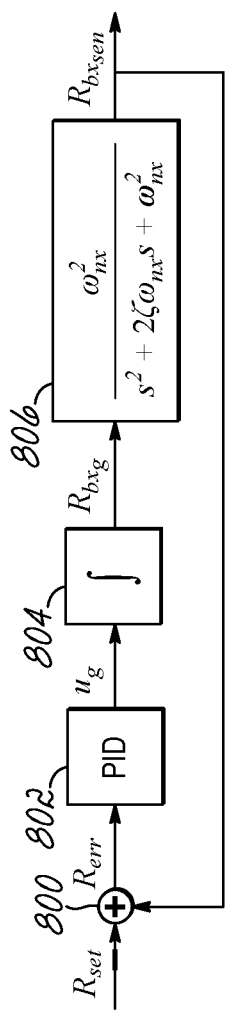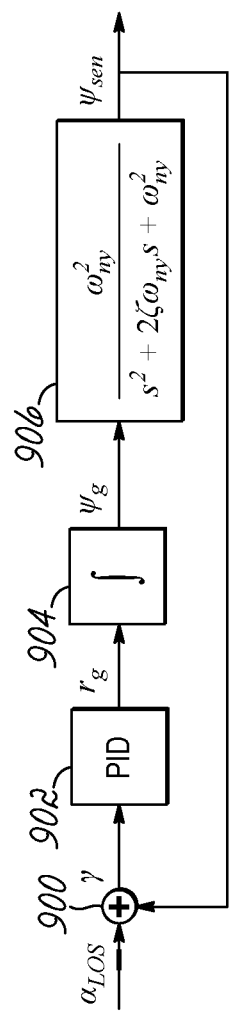
FIG. 8
FIG. 9

AUTONOMOUS AUTOMOBILE GUIDANCE AND TRAJECTORY-TRACKING

CROSS-REFERENCE TO RELATED APPLICATIONS

This application claims the benefit of and priority to co-pending Intl. Application No. PCT/US2017/061319 claiming the benefit of U.S. Application No. 62/420,314, filed Nov. 10, 2016, and of U.S. Application No. 62/484,543, filed Apr. 12, 2017, the disclosures of which are all incorporated by reference herein in their entireties.

BACKGROUND

This invention generally relates to automatic guidance and control of car-like ground vehicles, and more particularly to systems, methods, and computer program products for providing steering and motor control signals to a car-like ground vehicle.

According to the National Highway Traffic Safety Administration (NHTSA), in 2014 there were 6 million police reported highway collisions, which resulted in more than 2 million personal injuries and 32,675 fatalities. Of these traffic accidents, 94% were attributed to driver error. It is believed that autonomous, or "self-driving" cars would significantly reduce such accidents. Currently, almost all car manufacturers have started developing self-driving cars, and a number of self-driving vehicles have been road tested or even licensed to drive with human driver supervision.

Transportation vehicle motion controls can be categorized as path-following and trajectory-tracking. Path-following refers to traversing a prescribed path without time constraints, whereas trajectory-tracking allows the vehicle to traverse a path with prescribed time (neutral tracking), with a formation such as in a platoon to increase the highway capacity or for adaptive cruise control (cooperative tracking), or to pursue an evading vehicle such as a police vehicle chasing a fugitive's vehicle (adversarial tracking). Conventional self-driving cars are designed for path-following, and have limited maneuverability or practical applications. Path-following guidance typically employs what is known as an arc-pure-pursuit algorithm, which does not incorporate speed constraints. This design involves empirical determination of controller parameters, which may also limit the vehicle's performance potential. Trajectory-tracking has proven to be a much more difficult control and guidance problem for a car than path-following due to the requirements on motion speed imposed on vehicles.

Conventional automatic motion controllers for cars use separate controllers for steering and throttle, which tends to further limit the performance potential of the vehicle. In order to effectively cope with the nonlinear and time-varying nature of car-like ground vehicle motion control, conventional systems may use what is known as a Model Predictive Control (MPC) technique. MPC runs a simulation of the vehicle motion over a finite future time interval with currently computed controller gains. MPC then modifies the vehicle model based on the simulation results, performs an on-line optimal control design to obtain a new set of gains, uses these gains to control the vehicle to the next decision time step, and repeats the process at every control decision step, typically between 50 and 100 times per second. Such controllers are extremely computation-intensive, yet with limited performance and a lack of stability.

Thus, there is a need for improved methods, systems, and computer program products for controlling autonomous driving cars.

SUMMARY

An embodiment of the invention provides an integrated three degrees-of-freedom (3DOF) trajectory linearization trajectory-tracking controller and a pure pursuit guidance controller for neutral, cooperative, and adversarial tracking operations. Together with a top-level cognitive mission planner, embodiments of the invention may facilitate fully autonomous car-like ground vehicle operation. Embodiments of the invention may also serve as a baseline controller for more advanced automobile loss-of-control prevention and recovery controller, and may be adapted to any car-like wheeled robot.

A multi-loop 3DOF trajectory linearization controller is configured to guide a vehicle having nonlinear rigid-body dynamics with nonlinear tire traction force, nonlinear drag forces and actuator dynamics. The trajectory linearization controller may be based on a singular perturbation (time-scale separation) theory for exponential stability, and controls the longitudinal velocity and steering angle simultaneously to follow a feasible guidance trajectory. This modeling and design approach is supported with computer simulation and hardware test results on a scaled-down model car.

Embodiments of the invention may further include a line-of-sight based pure-pursuit guidance controller that enables trajectory-tracking. The guidance controller may generate a 3DOF spatial trajectory which is provided to the 3DOF trajectory-tracking controller. The resulting combination may provide a 3DOF motion control system with integrated (simultaneous) steering and speed control for automobile and car-like mobile robot trajectory-tracking.

The above summary presents a simplified overview of some embodiments of the invention in order to provide a basic understanding of certain aspects the invention described herein. The summary is not intended to provide an extensive overview of the invention, nor is it intended to identify any key or critical elements or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 8 is a schematic view of a closed-loop system that may be used in the speed guidance module of FIG. 7.

FIG. 9 is a schematic view of a closed-loop system that may be used in the heading guidance module of FIG. 7.

DETAILED DESCRIPTION

Embodiments of the invention include control systems for autonomous car-like ground vehicles that provide vehicle motion control with three degrees of freedom (3DOF). 3DOF vehicle motion control faces several challenges. For example, the vehicle rigid-body, tire traction force, and the various drag force models are highly nonlinear. Another challenge is that, even though the vehicle dynamics may be treated as time invariant, the tracking error dynamics along a time-dependent trajectory are typically time-varying. Moreover, car-like ground vehicles are subject to nonholonomic kinematic constraints, which further necessitates time-varying and non-smooth guidance and control algorithms.

3DOF motion control may be categorized as path-following and trajectory-tracking. Path-following only requires the vehicle to follow a specified path without time constraints. Thus, path-following controller systems only need to deal with vehicle kinematics. In contrast, trajectory-tracking control systems require the vehicle to traverse a prescribed path with a given velocity. Trajectory-tracking is more challenging than path-following because the vehicle dynamics must be considered in addition to vehicle kinematics. Embodiments of the invention address these problems using 3DOF motion control for nonholonomic ground vehicle trajectory-tracking with nonlinear vehicle and force models.

It is typically desirable to control the translational and rotational motions of the vehicle simultaneously. However, the vehicle dynamics of translational and rotational motions are highly coupled and nonlinear, which creates additional challenges for the control system. Moreover, even though the vehicle dynamics may be time invariant, the trajectory of the vehicle is time varying, which means the tracking error dynamics are also time varying.

Embodiments of the invention use Trajectory Linearization Control (TLC) to address the challenges of the nonholonomic ground vehicle trajectory-tracking control problem.

TLC provides a nonlinear time-varying controller that combines nonlinear dynamic inversion with linear time-varying feedback stabilization. A TLC based controller can be viewed as the gain-scheduling controller that is designed at each point on the trajectory to provide robust stability.

Figure 1:
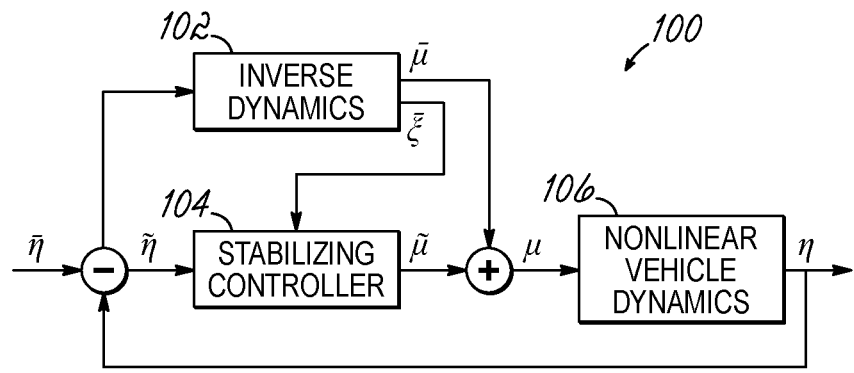
FIG. 1 is a schematic view of trajectory linearization controller in accordance with an embodiment of the invention.

Referring now to FIG. 1, a TLC system 100 may include an open-loop nominal controller 102 (e.g., an inverse dynamics module) and a closed-loop tracking error regulator 104 (e.g., a stabilizing controller). The nominal controller 100 may be configured to cancel nonlinearities of a nonlinear vehicle dynamics 106 in the open-loop, thereby reducing the tracking error. This reduction in tracking error may facilitate linearization of the nonlinear tracking error dynamics for stabilization. The tracking error dynamics that are nonlinear and time varying may be exponentially stabilized using a linear time-varying (LTV) coordinate transformation and PD-eigenvalue assignment.

A multi-loop trajectory-tracking TLC for vehicles without nonholonomic constraints may be modified to handle car-like vehicles by decoupling the position error in a body-fixed frame of reference rather than in an inertial frame of reference. This feature may enable the vehicle control system to handle a nonholonomic constraint on the lateral motion of the vehicle. The vehicle control systems disclosed herein may have applications to any type of vehicle where controllability is different along each body axis.

Figure 2:
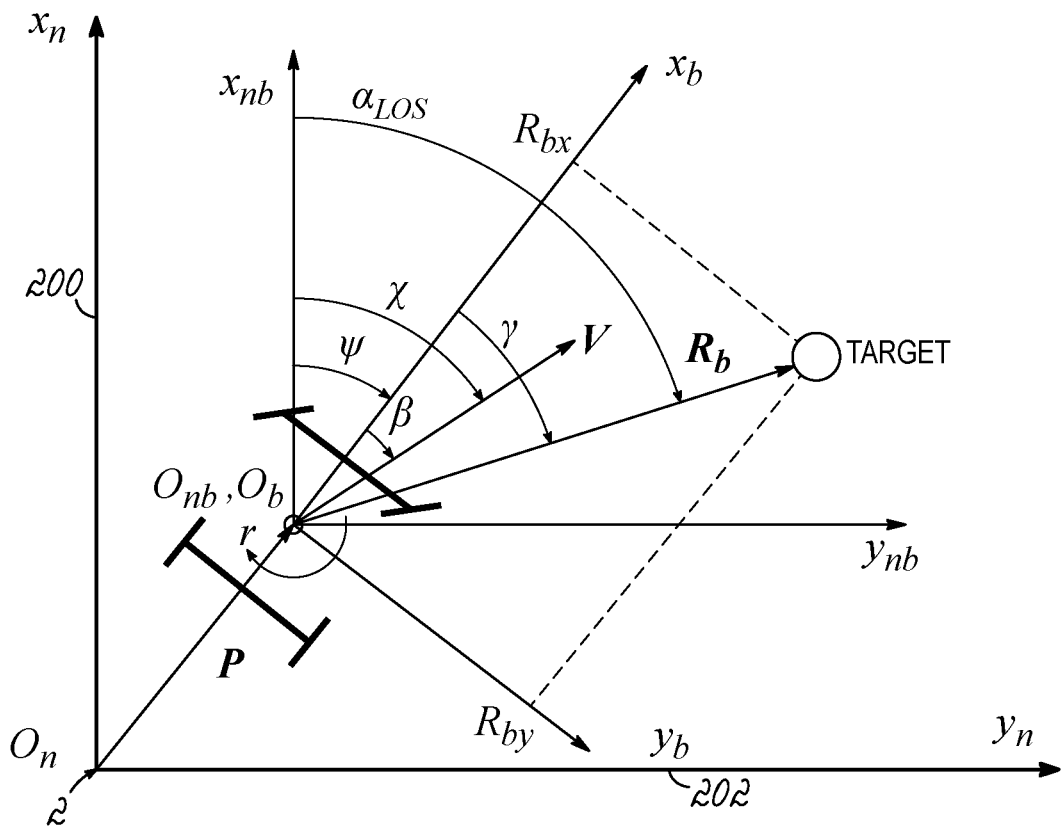
FIG. 2 is a diagrammatic view of a plurality of reference frames that may be used by the trajectory linearization controller of FIG. 1 to control a vehicle.

FIG. 2 depicts a plurality of frames of reference that may be used to control vehicle motion. The frames of reference include a North-East-Down (NED) navigation frame of reference ("n-frame"), a NED body-carried frame of reference ("nb-frame"), and a body-fixed frame of reference ("b-frame"). The n-frame may include an origin $O_n$ that is fixed at a point of interest on the surface of the Earth. The n-frame may be treated as flat and inertial, and may include an $x_n$ axis 200 that points in one direction (e.g., to the north), a $y_n$ axis 202 that points in another direction (e.g., to the east), and a $z_n$ axis (not shown) that points in yet another direction (e.g., down).

The nb-frame may be parallel to the n-frame but with an origin $O_{nb}$ at center of the gravity (CG) of the vehicle. For the b-frame, the origin $O_b$ may also be fixed at the CG of the vehicle, with $x_b$ pointing forward along the longitudinal axis of the vehicle, $y_b$ pointing to the starboard side of the vehicle, and $z_b$ pointing down. As depicted in FIG. 2, $\beta$ is the vehicle sideslip angle, $\chi$ is the vehicle course angle, $\alpha_{LOS}$ is the line of sight angle in the n-frame from the vehicle to the target, $\gamma$ is line-of-sight angle in the b-frame, $P=[x_n\ y_n]^T$ is the vehicle position in the n-frame, $R_b$ is the range vector in the b-frame, $P=[x_n\ y_n]^T$ is the vehicle position in the n-frame, $V=[u\ v]^T$ is the velocity in the b-frame, W is the yaw angle between the b-frame and the nb-frame, $r=\dot{\psi}$ is the yaw angular rate in the b-frame, and $\delta$ is the front tire steering angle.

In the below descriptions of car-like ground vehicle trajectory-tracking, some assumptions may be made to simplify analysis of the motion of the vehicle. These assumptions may include that the vehicle is a rigid-body, that the weight of the vehicle is equally distributed between each of the four wheels, and that the vehicle is driving on a level and smooth road. These simplifications may allow pitching and rolling motions to be ignored, and longitudinal lateral motion control to be combined with steering control. Due to the nonholonomic constraint of the car-like ground vehicle, lateral force is assumed to not generate lateral acceleration. Rather, lateral acceleration is assumed to be solely a result of rotational motion.

In view of the above constraints, the state space equations may be directly simplified from six degrees-of-freedom (6DOF) rigid body equations of motion to 3DOF equations of motion using the following equations:

Translational Kinematics:

$$\begin{bmatrix} \dot{x}_n \\ \dot{y}_n \end{bmatrix} = \begin{bmatrix} C_\psi & -S_\psi \\ S_\psi & C_\psi \end{bmatrix} \begin{bmatrix} u \\ v \end{bmatrix} = B_1(\psi)V \quad \text{(Eqn. 1)}$$

where $S_\psi = \sin\psi$ and $C_\psi = \cos\psi$.

Translational Dynamics:

$$\begin{bmatrix} \dot{u} \\ \dot{v} \end{bmatrix} = \begin{bmatrix} 0 & r \\ -r & 0 \end{bmatrix} \begin{bmatrix} u \\ v \end{bmatrix} + \frac{1}{m}\begin{bmatrix} F_x \\ F_y \end{bmatrix} = A_2(r)V + \frac{1}{m}\begin{bmatrix} F_x \\ F_y \end{bmatrix} \quad \text{(Eqn. 2)}$$

Rotational Kinematics:

$$\dot{\psi} = r \quad \text{(Eqn. 3)}$$

Rotational Dynamics:

$$\dot{r} = \frac{1}{I_{zz}} N_m \quad \text{(Eqn. 4)}$$

where $F=[F_x\ F_y]^T$ is the body frame force, $N_m$ is the yaw moment, m is the total mass of the vehicle, and $I_{zz}$ is the moment of inertia about the $Z_b$-axis.

The total longitudinal force $F_x$ and lateral force $F_y$ may be written as:

$$F_x = F_{xtf}\cos(\delta) + F_{xtr} - F_{ytf}\sin(\delta) + F_{rr} + F_{aero} + F_B$$

$$F_y = F_{xtf}\sin(\delta) + F_{ytf}\cos(\delta) + F_{ytr} + F_{yst} \quad \text{(Eqn. 5)}$$

where $F_{rr} = -C_{rr}mg\,\text{sgn}(u)$ is the rolling resistance;

$$F_{aero} = -C_D \frac{\sigma}{2} A_F u^2 \text{sgn}(u)$$

is the longitudinal aerodynamic drag force; $F_B = \delta_B F_{B,max}$ is the braking force; $F_{xt}$ and $F_{yt}$ are longitudinal and lateral tire traction forces, respectively; $F_{yst}$ is the tire lateral stiction force; and the subscripts f and r indicate the force in question is associated with the front axle or the rear axle, respectively.

For wheeled car-like ground vehicles, the propulsion and control forces and the steering moment may be effected by the traction forces of the tires. Because of the highly nonlinear behavior of these traction forces, tire traction force modeling can be a significant and difficult challenge in designing car-like ground vehicle control systems.

In an embodiment of the invention, the longitudinal tire traction force may be defined as:

$$F_{xtr} = F_{xtf} = \frac{1}{2} C_\alpha \alpha(u, \omega_w) \quad \text{(Eqn. 6)}$$

where $C_\alpha$ is the 4-wheel total tire stiffness coefficient, and $\alpha$ is the longitudinal slip angle. The longitudinal slip angle $\alpha$ may be defined as:

$$\alpha(u, \omega_w) = \begin{cases} \tan^{-1}\frac{R_{eff}\omega_w - u}{u}, & \text{during braking} \\ \tan^{-1}\frac{R_{eff}\omega_w - u}{R_{eff}\omega_w}, & \text{during acceleration} \end{cases} \quad \text{(Eqn. 7)}$$

where $R_{eff}$ and $\omega_w$ are the effective radius and angular speed of the wheel, respectively. To apply the controller for reverse driving, a negative sign may be added to each of the braking and acceleration equations defining the function $\alpha(u, \omega_w)$.

The lateral tire traction force at the front and rear axles may be defined, respectively, as:

$$F_{yf}=\tfrac{1}{2}C_\beta(\delta-\beta), F_{yr}=C_\beta(-\beta) \tag{Eqn. 8}$$

where $\beta$ defines the tire sideslip angle, $\delta$ is vehicle steering angle, and $C_\beta$ is the vehicle total cornering stiffness. In an embodiment of the invention, it may be assumed that no lateral tire skidding occurs. Under this assumption, the lateral force $F_y$ cannot generate lateral displacement, thereby imposing a nonholonomic constraint.

The yaw moment may be defined as:

$$N_m = \frac{\tfrac{1}{2}C_\beta l_f - \tfrac{1}{2}C_\beta l_r}{I_{zz}u}v - \frac{\tfrac{1}{2}l_f^2 C_\beta + \tfrac{1}{2}l_r^2 C_\beta}{I_{zz}u}r + \frac{\tfrac{1}{2}C_\beta l_f}{I_{zz}}\delta \tag{Eqn. 9}$$

where $l_f$ and $l_r$ are the longitudinal distance of the front and rear axle to the center of gravity. As with Eqn. 7, for reverse driving, a negative sign may be added to Eqn. 9.

Drive actuators for automobiles and other car-like ground vehicles typically include either an internal combustion engine plus mechanical brakes, or an electrical motor with regenerative braking and mechanical brakes. Steering actuators are typically either hydraulic or electric servos. For purposes of clarity, embodiments of the invention are described below as using an armature DC motor as the drive actuator, and a servo motor as the steering actuator. However, the invention is not limited to the use of any particular type of actuator for the drive actuator or the steering actuator.

An armature-controlled DC motor may be modeled by the following first-order linear ordinary differential equation:

$$J_m \dot{\omega}_m = -\left(B_m + \frac{K_m^2}{R_a}\right)\omega_m + \frac{K_m}{R_a}E_m - NR_{eff}F_{xL} \tag{Eqn. 10a}$$

where $F_{xL}$ is the longitudinal load force, $R_a$ is the electrical resistance of the armature, $J_m$ is the effective moment of inertia of the drive train about the motor shaft, $B_n$ is the effective torsional viscous friction coefficient of the drive train about the motor shaft, $K_m$ is motor electro-mechanical constant, and $R_{eff}$ is the effective radius of the tire.

The dynamics of the steering servo may be modeled by the following transfer function:

$$G(s) = \frac{\omega_{ns}}{s + \omega_{ns}} \tag{Eqn. 11b}$$

where $\omega_{ns}$ is the bandwidth of the servo motor.

The nonlinear trajectory-tracking problem may be formulated as a stabilization problem in the tracking error coordinate. This may reveal that the tracking error dynamics are time-varying for time-varying nominal trajectories, even if the vehicle dynamics are time-invariant. Thus, the TLC architecture may provide a solution to this problem formulation for trajectory-tracking.

The response of nonlinear vehicle dynamics to control input signals may be defined by:

$$\dot{\xi}(t)=f(\xi(t),\mu(t)), \eta(t)=h(\xi(t),\mu(t)) \tag{Eqn. 12}$$

where $\xi(t)\in R^n$, $\mu(t)\in R^l$, $\eta(t)\in R^m$ are the state, input, and output of the vehicle dynamics, control actuators, and navigation sensors, respectively. The mappings $h(\bullet): R^n \times R^l \to R^n$ and $f(\bullet): R^n \times R^l \to R^n$ may be bounded with uniformly bounded and continuous Jacobians. Letting $\bar{\xi}(t)$, $\bar{\mu}(t)$, $\bar{\eta}(t)$ be the nominal state, nominal input, and nominal output trajectory such that:

$$\dot{\bar{\xi}}(t)=f(\bar{\xi}(t)\bar{\mu}(t)),\bar{\eta}(t)=h(\bar{\xi}(t),\bar{\mu}(t)) \tag{Eqn. 13}$$

and defining the respective tracking errors and error control as:

$$\tilde{\xi}(t)=\xi(t)-\bar{\xi}(t),\tilde{\eta}(t)=\eta(t)-\bar{\eta}(t),\tilde{\mu}(t)=\mu(t)-\bar{\mu}(t) \tag{Eqn. 14}$$

may allow the tracking error dynamics to be written as:

$$\dot{\tilde{\xi}}=f(\bar{\xi}(t)+\tilde{\xi},\bar{\mu}(t)+\tilde{\mu})-f(\bar{\xi}(t),\bar{\mu}(t))=F(\tilde{\xi},\tilde{\mu},\bar{\xi}(t),\bar{\mu}(t))$$

$$\tilde{\eta}=h(\bar{\xi}(t)+\tilde{\xi},\bar{\mu}(t)+\tilde{\mu})-h(\bar{\xi}(t),\bar{\mu}(t))=H(\tilde{\xi},\tilde{\mu},\bar{\xi}(t),\bar{\mu}(t)) \tag{Eqn. 15}$$

where $\bar{\xi}(t)$, $\bar{\mu}(t)$ can be treated as known time-varying parameters. The nominal control input $\bar{\mu}(t)$ and nominal state $\bar{\xi}(t)$ can be determined by pseudo-inversion of the vehicle dynamics.

The tracking error dynamics defined by Eqn. 14 may be nonlinear and time-varying, which can be linearized along the nominal trajectories to obtain:

$$x=A(t)x+B(t)u, y=C(t)x+D(t)u \tag{Eqn. 16}$$

Where $x \approx \tilde{\xi}$, $y \approx \tilde{\eta}$ and $$A = \frac{\partial}{\partial \xi}f(\xi,\mu)|_{\bar{\xi},\bar{\mu}} = \frac{\partial}{\partial \tilde{\xi}}F(\tilde{\xi},\tilde{\mu},\bar{\xi}(t),\bar{\mu}(t))|_{\tilde{\xi},\tilde{\mu}=0} \tag{Eqn. 17}$$

$$B = \frac{\partial}{\partial \mu}f(\xi,\mu)|_{\bar{\xi},\bar{\mu}} = \frac{\partial}{\partial \tilde{\mu}}F(\tilde{\xi},\tilde{\mu},\bar{\xi}(t),\bar{\mu}(t))|_{\tilde{\xi},\tilde{\mu}=0}$$

$$C = \frac{\partial}{\partial \xi}h(\xi,\mu)|_{\bar{\xi},\bar{\mu}} = \frac{\partial}{\partial \tilde{\xi}}H(\tilde{\xi},\tilde{\mu},\bar{\xi}(t),\bar{\mu}(t))|_{\tilde{\xi},\tilde{\mu}=0}$$

$$D = \frac{\partial}{\partial \mu}h(\xi,\mu)|_{\bar{\xi},\bar{\mu}} = \frac{\partial}{\partial \tilde{\mu}}H(\tilde{\xi},\tilde{\mu},\bar{\xi}(t),\bar{\mu}(t))|_{\tilde{\xi},\tilde{\mu}=0}$$

The linearized tracking error dynamics defined by Eqn. 15 may be stabilized by applying the linear time-varying control algorithm $u=K(t)x$. The TLC may thereby combine nonlinear inversion and linear time-varying feedback stabilization. Since the stabilization is exponential, this may provide robust stability in the presence of regular and singular perturbations. As described below, a 3DOF controller for a nonholonomic ground vehicle may be implemented using the TLC control algorithms presented above.

Figure 3:
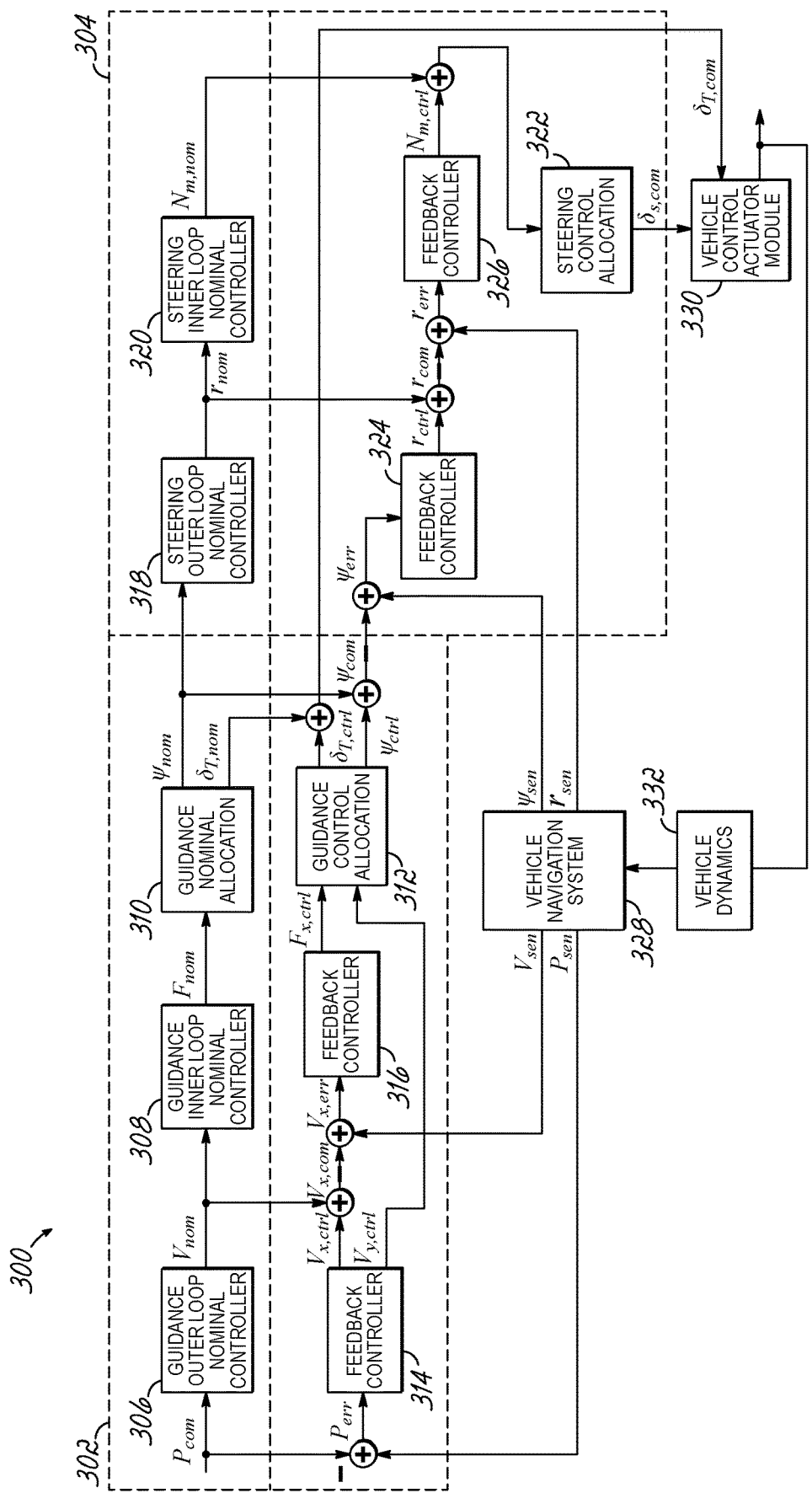
FIG. 3 is a schematic view of a trajectory-tracking controller that includes a guidance controller and a steering controller.

FIG. 3 depicts a block diagram of an exemplary four-loop 3DOF TLC trajectory-tracking controller 300 that includes a guidance controller 302 and a steering controller 304. The guidance controller 302 may include a guidance outer loop nominal controller 306, a guidance inner loop nominal controller 308, a guidance nominal allocation module 310, a guidance control allocation module 312, a guidance outer loop feedback controller 314, and a guidance inner loop feedback controller 316. The steering controller 304 may include a steering outer loop nominal controller 318, a steering inner loop nominal controller 320, a steering control allocation module 322, a steering outer loop feedback controller 324, and a steering inner loop feedback controller 326. The guidance controller 302 and the steering controller 304 may receive input signals from a vehicle navigation system 328, and provide signals to a vehicle control actuator module 330. The vehicle control actuator module 330 may control the actuators (e.g., drive and steering) that effect changes in the vehicle kinematics. Each of the nominal controllers 306, 308, 318, 320 may comprise an open-loop nominal controller that generates a nominal control signal and/or state. Each of the feedback controllers 314, 316, 324, 326 may comprise a closed-loop tracking error controller that stabilizes a tracking error in a corresponding control signal and/or state.

Strictly speaking, vehicle dynamics may refer to the physical properties of the vehicle, represented by Eqns. 2 and 4, which result from the mass of the vehicle, and the distribution of that mass in the vehicle. Vehicle kinematics, represented by Eqns. 1 and 3, are geometric properties of the vehicle that constrain the dynamics of the vehicle. Together, Eqns. 1-4 are known as the Equations of Motion, which may be categorically referred to as the vehicle dynamics, and are accounted for by the vehicle dynamics module 332. The control actuators, such as the motor and steering system, represented by Eqns. 10a and 10b, are actuators that overcome the vehicle's dynamics, thereby enabling the vehicle to move and maneuver. The tires are control effectors that transfer actuator forces and torques to the vehicle body, thereby allowing the vehicle to accelerate and turn.

In the below description of the trajectory-tracking controller 300, the subscript sim may be used to identify variables and/or signals associated with the simulated or actual vehicle state, the subscript sen may be used to identify variables and/or signals associated with sensed information or the simulated vehicle states passed through navigation sensors, the subscript nom may be used to identify variables and/or signals associated with a nominal signal, the subscript ctrl may be used to identify variables and/or signals associated with the output of the feedback controllers 314, 316, 324, 326, the subscript err may be used to identify variables and/or signals associated with the tracking error, and the subscript com may be used to identify variables and/or signals associated with the controller command signal.

The dynamic pseudo-inverse of the corresponding equations of motion may be used to generate the nominal control signals, and the feedback controllers 314, 316, 324, 326 may be Proportional-Integral (PI) controllers that are used to stabilize the tracking error in each loop. The guidance outer loop may receive a position command signal $P_{com}$ from a trajectory generator (not shown) and a position measurement signal $P_{sen}$ from the navigation system 328, and use these signals to determine the velocity control signal $V_{ctrl}$ for the guidance inner loop. The guidance inner loop may receive a velocity command signal $V_{com}$ from the guidance outer loop and a velocity measurement signal $V_{sen}$, and use these signals to determine a velocity error signal $V_{err}$.

The velocity control signal $V_{ctrl}$ may be a vector signal including a longitudinal velocity control signal $V_{x,ctrl}$ and a lateral velocity control signal $V_{y,ctrl}$ in the b-frame, the velocity command signal $V_{com}$ may be a vector signal including a longitudinal velocity command signal $V_{x,com}$ and a lateral velocity control signal $V_{y,com}$ in the b-frame, the velocity measurement signal $V_{sen}$ may be a vector signal including a longitudinal velocity measurement signal $V_{x,sen}$ and a lateral velocity measurement signal $V_{x,sen}$ in the b-frame, and the velocity error signal $V_{err}$ may be a vector signal including a longitudinal velocity error signal $V_{x,err}$ and a lateral velocity error signal $V_{y,err}$ in the b-frame.

The force control signal $F_{ctrl}$ for the guidance loop control allocation may be determined based on the velocity error signal $V_{err}$. The velocity command signal $V_{com}$ may be the sum of a nominal velocity signal $V_{nom}$ and the velocity control signal $V_{ctrl}$, as provided by:

$$V_{com} = V_{nom} + V_{ctrl}$$

The longitudinal velocity error signal $V_{x,err}$ may equal the difference between the longitudinal velocity command signal $V_{x,com}$ and the longitudinal velocity measurement signal $V_{x,sen}$ as provided by:

$$V_{x,err} = V_{x,com} - V_{x,sen}$$

The guidance allocation unit may determine the drive command signal $\delta_{T,com}$, which may correspond to a throttle position of an internal combustion engine or the voltage of an armature controlled DC motor, based on a force command signal $F_{com}$ and the yaw command signal $\psi_{com}$. The force command signal $F_{com}$ may be a sum of a nominal force signal $F_{nom}$ and the force control signal $F_{ctrl}$, as provide by:

$$F_{com} = F_{nom} + F_{ctrl}$$

One advantageous feature of the TLC trajectory tracking controller depicted in FIG. 3 is that the vehicle model is divided into the rigid-body model, the force model, and the actuator model, and each sub-model is handled separately. The overall closed-loop system may comprise four loops, with each loop having a complete TLC structure as shown in FIG. 1. The open-loop nominal controllers 306, 308, 318, 320 may use dynamic pseudo-inverses of the corresponding equations of motion to generate the nominal control signals and nominal states. The feedback controllers 314, 316, 324, 326 may each use a Proportional-Integral (PI) controller to exponentially stabilize the tracking errors.

The nominal velocity $V_{nom}$ signal in the b-frame may be determined by inverting Eqn. 1 to produce:

$$V_{nom} = B_1^{-1}(\psi_{nom}) \dot{P}_{nom} \qquad \text{(Eqn. 18)}$$

where $B_1^{-1}(\psi_{nom})$ is the matrix in Eqn. 1 with replaced by its nominal value $\psi_{nom}$. Here the nominal yaw signal $\psi_{nom}$ may be defined as described below, and $\dot{P}_{nom}$ may be determined from position command signal by a pseudo-differentiator of the form:

$$G_{diff}(s) = \frac{\omega_{n,diff}^2 s}{s^2 + 2\zeta\omega_{n,diff}s + \omega_{n,diff}^2} \qquad \text{(Eqn. 19)}$$

Figure 4:
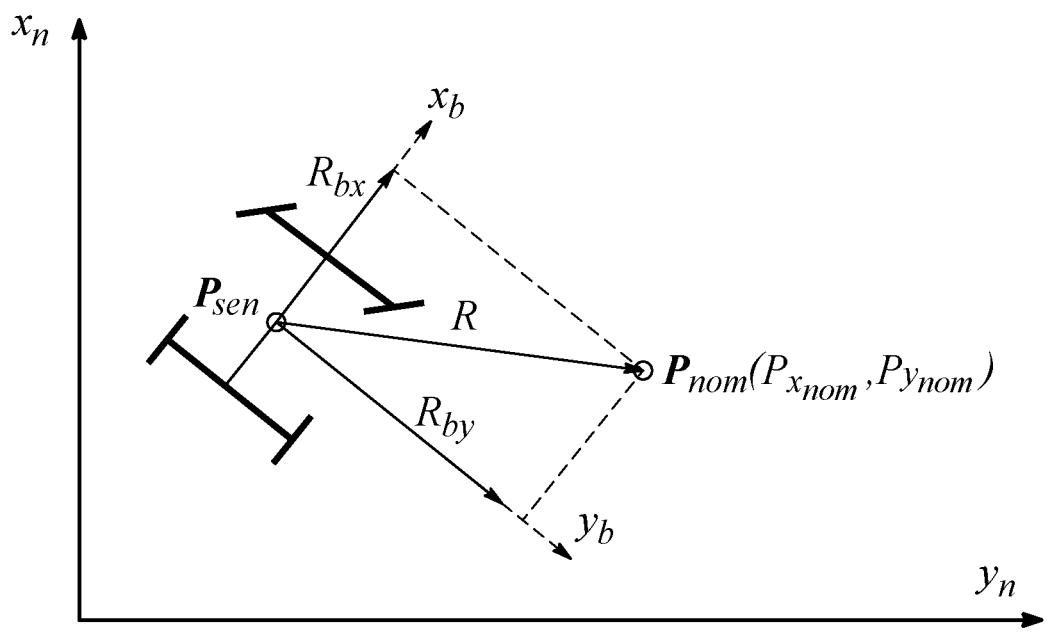
FIG. 4 is a diagrammatic view of an error coordinate frame.

A position tracking error $P_{err} = P_{sen} - P_{com}$ may be defined by decoupling the tracking error dynamics in the b-frame, rather than in the n-frame, to account for the nonholonomic constraint on the lateral motion of the vehicle. Referring to FIG. 4, a down-range distance $R_b$ may be defined as the magnitude of the projection of the negative position error $-P_{err}$ onto the body frame as follows:

$$R_b^{-1} = -B_1^{-1}(\psi_{sen}) P_{err}$$

The linearized error dynamics may then be given by:

$$\dot{R}_b = \begin{bmatrix} 0 & r_{nom} \\ -r_{nom} & 0 \end{bmatrix} R_b + V_{ctrl} \qquad \text{(Eqn. 20)}$$

The PI control algorithm may be given as:

$$V_{ctrl} = -K_{P1} R_b - K_{I1} \int_0^t R_b(\tau) d\tau \qquad \text{(Eqn. 21)}$$

where the PI gain matrices are given by:

$$K_{P1} = \begin{bmatrix} 0 & r_{nom} \\ -r_{nom} & 0 \end{bmatrix} - A_{1.1} = \begin{bmatrix} a_{111} & r_{nom} \\ -r_{nom} & a_{121} \end{bmatrix} \quad \text{(Eqn. 22)}$$

$$K_{I1} = -A_{1.2} = \begin{bmatrix} a_{112} & 0 \\ 0 & a_{122} \end{bmatrix}$$

in which $A_{i,k}=\text{diag}[-a_{i1k}-a_{i2k}]$, i=1, 2, 3, 4 and k=1, 2 are time-varying controller parameters which are synthesized from the desired closed-loop dynamic, and $\alpha_{ij1}$ is provided by:

$$a_{ij1}=2\zeta_{ij}\omega_{n,i,j}, a_{ij2}=\omega_{n,i,j}^2 \quad \text{(Eqn. 23)}$$

where $\omega_{n,i,j}$ is the desired natural frequency, $\zeta_{ij}$ is the desired constant damping ratio of the desired dynamics, j=1, 2 for the x and y channel, and i=1, 2 for the two guidance loops. The output of the guidance outer loop may combine the output of the nominal controller 306 and the output of the feedback controller 314 to generate the velocity command signal $$V_{com}=V_{nom}V_{ctrl}.$$

The guidance inner loop may receive the velocity command signal $K_{com}$ from the guidance outer loop and velocity measurement signal $V_{sen}$ from the navigation system 328 to determine the force command signal $F_{com}$ the for the guidance loop control allocation. The nominal force signal $F_{nom}$ may be determined using the translational dynamics Eqn. 2 to produce:

$$F_{nom}=m[\dot{V}_{nom}-A_2(r_{nom})V_{nom}] \quad \text{(Eqn. 24)}$$

Where $\dot{V}_{nom}=[\dot{u}_{nom}\ \dot{v}_{nom}]^T$ may be determined by passing the output of the guidance outer loop nominal controller 306 $V_{nom}$, through a pseudo-differentiator. The velocity tracking error Vern may be received by the guidance outer loop feedback controller 314 and defined as $V_{err}=V_{sen}-V_{nom}$.

The linearized error dynamics of the body velocity are given by:

$$\dot{V}_{err} = A_2(r_{nom})V_{err} + \frac{1}{m}F_{ctrl} \quad \text{(Eqn. 25)}$$

where $A_2(\bullet)$ corresponds to the matrix of Eqn. 2. The guidance inner loop feedback controller 316 may determine a force control signal $F_{ctrl}$ defined by:

$$F_{ctrl}=-K_{P2}V_{err}-K_{I1}\int_0^t V_{err}(\tau)d\tau \quad \text{(Eqn. 26)}$$

The body velocity PI parameters may be given as:

$$K_{P2} = m[A_2(r_{nom}) - A_{2.1}] = m\begin{bmatrix} 0 & r_{nom} \\ -r_{nom} & 0 \end{bmatrix} \quad \text{(Eqn. 27)}$$

$$K_{I1} = -mA_{2.2} = m\begin{bmatrix} a_{212} & 0 \\ 0 & a_{222} \end{bmatrix}$$

As described above, in a car-like ground vehicle that is nonholonomic, a lateral force in the b-frame does not generate lateral displacement, i.e., the tires do not slide relative to the pavement. Thus, it may only be necessary to use an x-channel based on $F_{nom}$ and $F_{ctrl}$ to control the drive actuator. The lateral position error may be corrected by the yaw angle $\psi$, as described in more detail below.

The guidance controller 302 may determine the drive command signal $\delta_{T,com}$ and the yaw command signal $\psi_{com}$. Under the rigid body and level ground assumptions, the rotational motion may depend solely on the yaw angle $\psi$. Thus, the roll angle $\phi$ and pitch angle $\theta$ may either be constrained to zero or treated as disturbances. The longitudinal force $F_x$ (e.g., as characterized by a longitudinal force control signal $F_{x,ctrl}$) may be used to determine a drive control signal $\delta_{T,ctrl}$. The drive control signal $\delta_{T,ctrl}$ may be summed with a nominal drive signal $\delta_{T,nom}$ to produce the drive command signal $\delta_{T,com}$, which for a drive actuator comprising a DC motor, may correspond to the voltage applied to the DC motor.

For a drive actuator comprising a DC motor in which $\delta_T=E_m$, the voltage applied to the DC motor may be determined by inverting Eqn. 10 to produce:

$$\delta_{T,com} = \quad \text{(Eqn. 28)}$$
$$E_m = \frac{J_m R_a}{K_m}\dot{\omega}_{m,nom} + \left(\frac{B_m R_a}{K_m} + K_m\right)\omega_{m,nom} + \frac{R_{eff} R_a}{K_m}F_{x,com}$$

where $\omega_{m,nom}$ is determined from the nominal angular speed of the wheel $\omega_{w,nom}$. The nominal angular speed of the wheel $\omega_{w,nom}$ may be determined by inverting Eqn. 6 with the nonlinear tire traction force model of Eqn. 7, and $\dot{\omega}_{m,nom}$ may be determined by passing $\omega_{m,nom}$ through a pseudo-differentiator.

Referring again to FIG. 2, the yaw angle $\psi$ of the vehicle may be determined by:

$$\psi=\chi-\beta$$

where $\chi$ is the course angle of the vehicle and $\beta$ is the sideslip angle of the vehicle. The nominal course angle $\chi_{nom}$ may be defined as:

$$\chi_{nom} = \tan^{-1}\frac{\dot{x}_{n,nom}}{\dot{y}_{n,nom}}$$

Because $\beta$ can make the dynamic inverse unstable, it may be excluded from the nominal dynamic inverse, e.g., by setting $\beta_{nom}=0$, so that $\psi_{nom}=\chi_{nom}$. By allowing the feedback controller to manage $\beta$, the yaw control signal may be defined as:

$$\psi_{ctrl} = \beta_{ctrl} = \tan^{-1}\frac{v_{ctrl}}{u_{nom}} \quad \text{(Eqn. 29)}$$

where $V_{ctrl}$ is a second channel of $V_{ctrl}$ output from the guidance outer loop feedback controller 314 which may be received by the guidance control allocation module 312. Thus:

$$\psi_{com}=\psi_{nom}+\psi_{ctrl}$$

The outer loop of the steering controller 304 may receive the yaw command signal $\psi_{com}$ from the guidance controller 302 and the yaw measurement signal $\psi_{sen}$ from the navigation system 328, and determine the body angular rate command signal for the inner loop based thereon. The nominal yaw angular rate signal $r_{nom}$ may be determined by inverting Eqn. 3, which yields:

$$r_{nom}=\dot{\psi}_{nom} \quad \text{(Eqn. 30)}$$

Where $\dot{\psi}_{nom}$ is determined by passing $O_{nom}$ through a pseudo-differentiator. The tracking error control algorithm for this loop may be provided by:

$$r_{ctrl} = K_{P3}\psi_{err} - K_{I3}\int_0^t \psi_{err}(\tau)d\tau \qquad \text{(Eqn. 31)}$$

where the yaw tracking error signal $\psi_{err} = \psi_{sen} - \psi_{com}$, the control gains are given as $$K_{P3} = a_{331}, K_{I3} = a_{332} \qquad \text{(Eqn. 32)}$$

and the yaw angular rate command signal $r_{com}$ output by the steering outer loop nominal controller 318 is the sum of the nominal yaw angular rate $r_{nom}$ and the yaw angular rate control signal $r_{ctrl}$:

$$r_{com} = r_{nom} + r_{ctrl}$$

The steering inner loop may receive the body yaw angular rate command signal $r_{com}$ from the steering outer loop feedback controller 324 and the yaw angular rate measurement signal $r_{sen}$ from the navigation system 328, and determine a yaw angular rate error signal $r_{err}$ based on the difference between the signals. The steering inner loop feedback controller 326 may then determine a nominal body torque signal $N_{m,nom}$ based the yaw angular rate error signal $r_{err}$.

To this end, inverting Eqn. 4 may result in a nominal body torque of:

$$N_{m,nom} = I_{zz}\dot{r}_{nom} \qquad \text{(Eqn. 33)}$$

where $\dot{r}_{nom}$, is determined by passing $r_{nom}$ through a pseudo-differentiator, e.g., the steering outer loop feedback controller 324. The nominal body torque signal $N_{m,com} = N_{m,nom} + N_{m,ctrl}$ may thereby be determined based on the yaw command signal $\psi_{com}$ received from the guidance controller 302 and the yaw measurement signal $\psi_{sen}$ received from the navigation system 328. The steering controller 304 may determine the body torque command signal $N_{m,com}$ based on the body torque control signal $N_{m,ctrl}$ and the nominal body torque signal $N_{m,nom}$, e.g., by summing the signals so that $N_{n,com} = N_{m,ctrl} + N_{m,nom}$. The steering control allocation module 322 may then determine the steering drive command signal $\delta_{S,com}$ based on the body torque command signal $N_{m,com}$.

The PI control algorithm for the inner loop may be defined by:

$$N_{m_{ctrl}} = -K_{P4}r_{err} - K_{I4}\int_0^t r_{err}(\tau)d\tau \qquad \text{(Eqn. 34)}$$

where the body angular rate tracking error is $r_{err} = r_{sen} - r_{nom}$, the control gains are given by:

$$K_{P4} = I_{zz}a_{431}, K_{I4} = a_{432} \qquad \text{(Eqn. 35)}$$

and the output of the steering inner loop is $N_{m_{com}} = N_{m_{nom}} + N_{m_{ctrl}}$.

The steering control allocation module 322 may be used to allocate the moment command signal to steering angle and further determine the steering angle command signal $\delta_{S,com}$. The steering angle command signal $\delta_{S,com}$ may be determined by inverting Eqn. 10 to produce:

$$\delta_{S,com} = \left(N_{m_{com}} + \frac{C_\beta(l_f^2 + l_r^2)}{u_{nom}}\right)\frac{2}{C_\beta l_f} \qquad \text{(Eqn. 36)}$$

Figure 5:
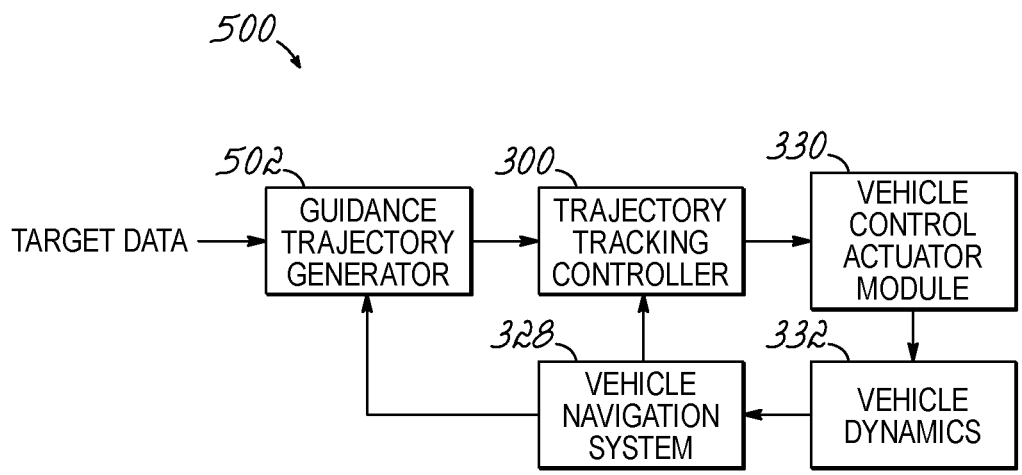
FIG. 5 is a schematic view of a guidance, navigation, and control system for an autonomous car-like ground vehicle.

FIG. 5 depicts a car-like ground vehicle Guidance, Navigation, and Control (GN&C) system 500 including the trajectory-tracking controller 300 and a guidance trajectory generator 502, and that receives feedback signals from the navigation system 328 and provides control signals to the vehicle actuators, represented by the vehicle control actuator module 330. For nonlinear systems, the stability of motion may be generally local in nature, and the domain of attraction may be finite. Thus, when the vehicle tracking error is out of the domain of attraction, such as when the initial vehicle state is far from the mission trajectory, the guidance trajectory generator 502 may be necessary to generate a feasible nominal trajectory that can lead the vehicle to the mission trajectory.

One type of pure pursuit guidance determines a circumferential arc that joins the current position of the vehicle and a target point in front of the vehicle on the nominal path. The vehicle then follows the arc as it moves forward towards the nominal path. However, arc based pure pursuit guidance systems do not consider the speed of the vehicle, and may therefore not be suitable for trajectory-tracking in car-like ground based vehicles.

Another type of pure pursuit guidance that has been used for aircraft pursuit aligns the velocity vector of the pursuing vehicle with the line-of-sight joining the vehicle with a real or virtual target. A normal acceleration command signal is generated and converted into an attitude command signal for maneuvering the aircraft. Unlike aircraft, which enjoy full 6DOF motion, car-like ground vehicles are subject to a nonholonomic motion constraint because lateral force cannot generate lateral acceleration. Thus, conventional aircraft line-of-sight pure pursuit guidance, which generates a normal acceleration command signal, cannot be used to directly guide a car-like ground vehicle. Embodiments of the invention overcome this issue by generating a feasible n-frame position trajectory for the tracking controller.

To this end, a modified line-of-sight pure pursuit guidance system may be configured to operate with car-like ground vehicle trajectory-tracking guidance. This may be accomplished by applying line-of-sight pure pursuit guidance to trajectory-tracking instead of path-following for a nonlinear, nonholonomic, car-like vehicle, decoupling the line-of-sight into heading and speed guidance control in the body frame to overcome the lateral nonholonomic constraint, and generating a guidance trajectory in the inertial frame for the 3DOF inertial position trajectory controller instead of generating an acceleration command signal.

Figure 6:
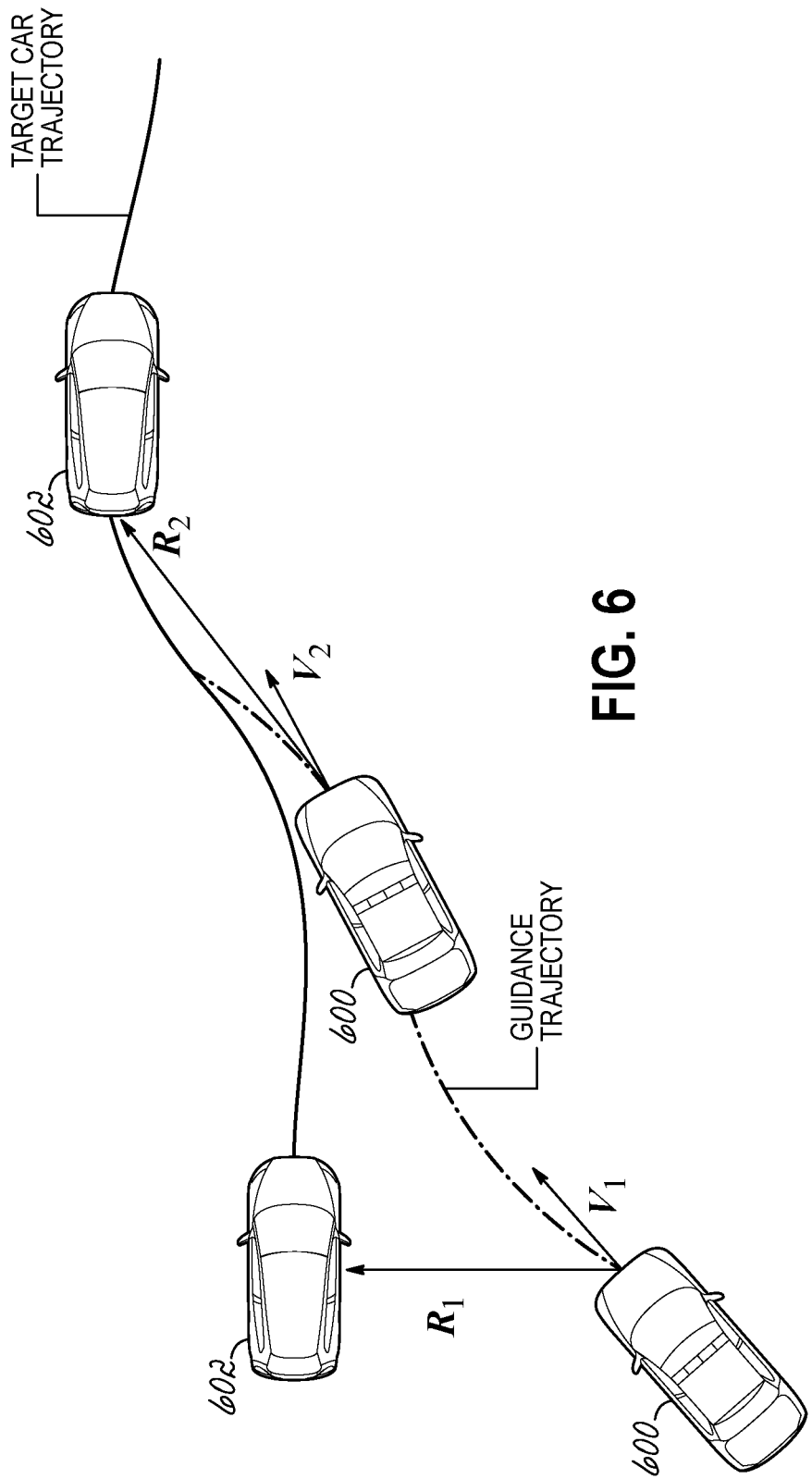
FIG. 6 is a diagrammatic view depicting a positional relationship between a guided vehicle and a target vehicle.

Referring now to FIG. 6, embodiments of the invention may be used in many trajectory-tracking applications, either for cooperative pursuit such as vehicle platoon, passive pursuit such as in adaptive cruise control and lane tracking, or adversarial pursuit such as vehicle-to-vehicle chasing such as an unmanned law enforcement vehicle 600 chasing a fugitive vehicle 602. The vehicle-to-vehicle chasing case may be used as an exemplary case for describing the line-of-sight pure pursuit guidance design. However, other applications of the line-of-sight pure pursuit guidance may be possible.

In the following description of an exemplary line-of-sight pure pursuit guidance system, it is assumed that the pursuing vehicle's maneuverability is at least as good as the target vehicle, and the road conditions are ideal. The line-of-sight pure pursuit guidance trajectory generator may have multiple objectives. These objectives may include: acquire a line-of-sight vector in the b-frame; align the velocity vector with the line-of-sight vector; keep a safety longitudinal distance between the chasing vehicle and the target; and generate a nominal guidance trajectory $P_g$ in the Cartesian n-frame. The nominal guidance trajectory $P_g$ may be provided to the trajectory-tracking controller 300 as the position command signal $P_{com}$.

The n-frame line-of-sight angle $\alpha_{LOS}$ may be defined as:

$$\alpha_{LOS} = \tan^{-1}\frac{P_{y_{tgt}} - P_y}{P_{x_{tgt}} - P_x} \quad \text{(Eqn. 36)}$$

where $[P_{x_{tgt}} \ P_{y_{tgt}}]^T$ and $[P_x \ P_y]^T$ are the target and pursuing vehicle's n-frame positions, respectively.

Let $$R = [P_{x_{tgt}} - P_x, P_{y_{tgt}} - P_y]^T \quad \text{(Eqn. 37)}$$

be the range vector in the n-frame. The objective of line-of-sight pure pursuit guidance may be to align the velocity vector with the line-of-sight vector so that the following equation is satisfied:

$$V \times R = 0 \Rightarrow \alpha_{LOS} - \chi_g = 0 \quad \text{(Eqn. 38)}$$

where the subscript g indicates the variable is a guidance signal.

Figure 7:
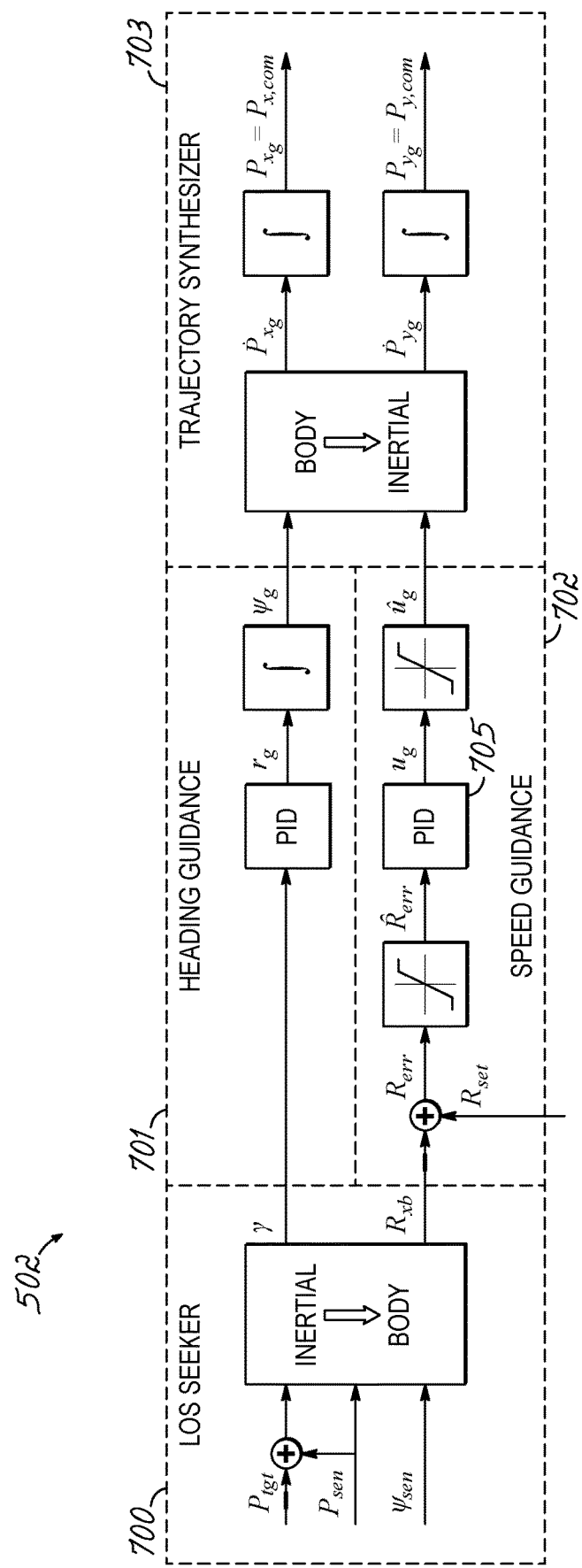
FIG. 7 is a schematic view of a trajectory generator that may be used with the guidance, navigation, and control system of FIG. 5 which includes a line-of-sight seeker module, a heading guidance module, a speed guidance module, and a trajectory synthesizer module.

FIG. 7 depicts an exemplary embodiment of the guidance trajectory generator 502 in more detail. The guidance trajectory generator 502 include a line-of-sight seeker module 700, a heading guidance module 701, a speed guidance module 702, and a trajectory synthesizer module 703. Each of the modules 700-703 may be configured to cause the trajectory generator 502 to achieve a specific line-of-sight pure pursuit guidance objective.

The line-of-sight seeker module 700 may be configured to determine the line-of-sight vector in the b-frame by acquiring the b-frame line-of-sight angle $\gamma$ with respect to the longitudinal axis $x_b$, and to determine the longitudinal down-range distance $R_{bx}$. The line-of-sight in the n-frame may be determined using Eqn. 37. The b-frame line-of-sight angle $\gamma$ may be determined as:

$$\gamma = \alpha_{LOS} - \psi_{sen}$$

where $\psi_{sen}$ is the current instant navigation sensor sensed yaw angle. The down-range vector $R_b$ in the b-frame may be given by:

$$R_b = \begin{bmatrix} \cos\psi & \sin\psi \\ -\sin\psi & \cos\psi \end{bmatrix} R_{n,b}$$

Letting $$R_b = \sqrt{(P_{x,tgt} - P_x)^2 + (P_{y,tgt} - P_y)^2}$$

be the range between the pursuing vehicle and the target, $R_{bx} = R_b \cos\gamma$ and $R_{by} = R_b \sin\gamma$ may provide a range projection to the $x_b$ and $y_b$ coordinate axes, respectively, to define a longitudinal component ($R_{bx}$) and a lateral component ($R_{by}$) of the range distance vector in the b-frame, where $\gamma$ is the angle between the line-of-sight vector and longitudinal axis $X_b$, $P_{x,tgt}$ and $P_{y,tgt}$ are the x and y coordinates of the target indicated by the target relative position signal $P_{tgt}$, and $P_x$ and $P_y$ are the x and y coordinates of the pursuing vehicle indicated by the position measurement signal $P_{sen}$. Although the above equations may define the functionality of the line-of-sight guidance seeker, embodiments of the invention may include line-of-sight seekers that determine the range vector and line-of-sight relative to the b-frame without requiring knowledge of the target relative position in the n-frame. For example, the line-of-sight seeker may include one or more of a camera, infrared camera, sonar, radar, and/or lidar.

The heading guidance module 701 may be configured to align the velocity vector with the line-of-sight vector. The nominal vehicle sideslip angle $\beta_{nom}$ may be managed by the feedback controller. This may allow the nominal vehicle sideslip angle $\beta_{nom}$ to be set to zero in the trajectory controller. Hence, $\beta_g$ may be zero in the guidance trajectory generator 502, in which case $\chi_g = \psi_g$, based on $\psi = \chi - \beta$. Eqn. 38 may then be rewritten as:

$$\gamma = \alpha_{LOS} - \psi_g = 0, \text{ as } t \to \infty \quad \text{(Eqn. 39)}$$

Thus, the heading guidance objective is to exponentially stabilize $\gamma = 0$ using the guidance angle $\psi_g$ as a virtual control, for which a Proportional-Integral-Derivative (PID) guidance controller may be employed to provide:

$$r_g = K_{I1}\int_0^t \gamma(\tau)d\tau + K_{P1}\gamma + K_{D1}\dot{\gamma}$$

$$\psi_g = \int_0^t r_g(\tau)d\tau \quad \text{(Eqn. 40)}$$

The PID gains may be determined using a linear time-invariant controller design technique based on the equivalent closed loop system shown in FIG. 9.

The speed guidance module 702 may be used to maintain a safe longitudinal distance between the pursuing vehicle and the target. To this end, a distance error may be defined as $R_{err} = R_{bx} - R_{set}$, where $R_{set}$ is the safe longitudinal distance setting. In general, $R_{set} = \tau|V_x|$ may be a velocity dependent parameter, where $\tau$ is an appropriate response time of the controller.

A PID controller 705 may be employed to exponentially stabilize $R_{err} \to 0$ as $t \to \infty$ by determining a guidance velocity $u_g$ as follows:

$$u_g = K_{I2}\int_0^t \hat{R}_{err}(\tau)d\tau + K_{P2}\hat{R}_{err} + K_{D2}\dot{R}_{err} \quad \text{(Eqn. 41)}$$

where $\hat{R}_{err}(\tau) = \text{sat}_{R_{err,max}}(R_{err})$, and $\text{sat}_a(x)$ is the saturation function defined by:

$$\text{sat}_a(x) = \begin{cases} a, & x > a \\ x, & |x| \le a, a > 0 \\ -a, & x < -a \end{cases} \quad \text{(Eqn. 42)}$$

The limit $R_{err,max}$ may be chosen to limit the maximum guidance acceleration $\dot{u}_g$ due to large range errors, together with an integrator anti-wind up scheme.

The trajectory synthesizer module 703 may be used to construct the nominal guidance trajectory $P_g$ in the n-frame using the outputs of the heading guidance module 701 and speed guidance module 702 as follows $$\dot{P}_{x_g} = \hat{u}_g \cos\psi_g - v_g \sin\psi_g$$

$$\dot{P}_{y_g} = \hat{u}_g \sin\psi_g - v_g \cos\psi_g$$

$$\hat{u}_g = \text{sat}_{u_{max}}(u_g)$$

$$P_{x_g} = \int_0^t \dot{P}_{x_g}(\tau)d\tau$$

$$P_{y_g} = \int_0^t \dot{P}_{y_g}(\tau)d\tau \quad \text{(Eqn. 43)}$$

where $v_g$ is vehicle lateral velocity in the b-frame. Because the side slip angle $\beta_g = 0$, $v_g = 0$. The term $u_{max}$ define the maximum speed of the car taking into account skidding prevention, which can be adaptively set in real time based on the operating and pavement conditions.

FIG. 8 depicts an equivalent closed-loop system that may be used to analyze the stability of the speed guidance module 702 which includes a summing module 800, a PID module 802, an integrator module 804, and a transfer function module 806. FIG. 9 depicts an equivalent closed-loop system that may be used to analyze the stability of the heading guidance module 701 which includes a summing module 900, a PID module 902, an integrator module 904, and a transfer function module 906. In FIGS. 8 and 9, the overall close-loop position trajectory-tracking controller may be decoupled into steering and position control in the b-frame at different bandwidth using the following transfer functions:

$$\frac{R_{bx_{sen}}(s)}{R_{bg}(s)} = \frac{\omega_{nx}^2}{s^2 + 2\zeta\omega_{nx}s + \omega_{nx}^2} \quad \text{(Eqn. 44)}$$

$$\frac{\psi_{sen}(s)}{\psi_g(s)} = \frac{\omega_{nu}^2}{s^2 + 2\zeta\omega_{ny}s + \omega_{ny}^2}$$

Figure 10:
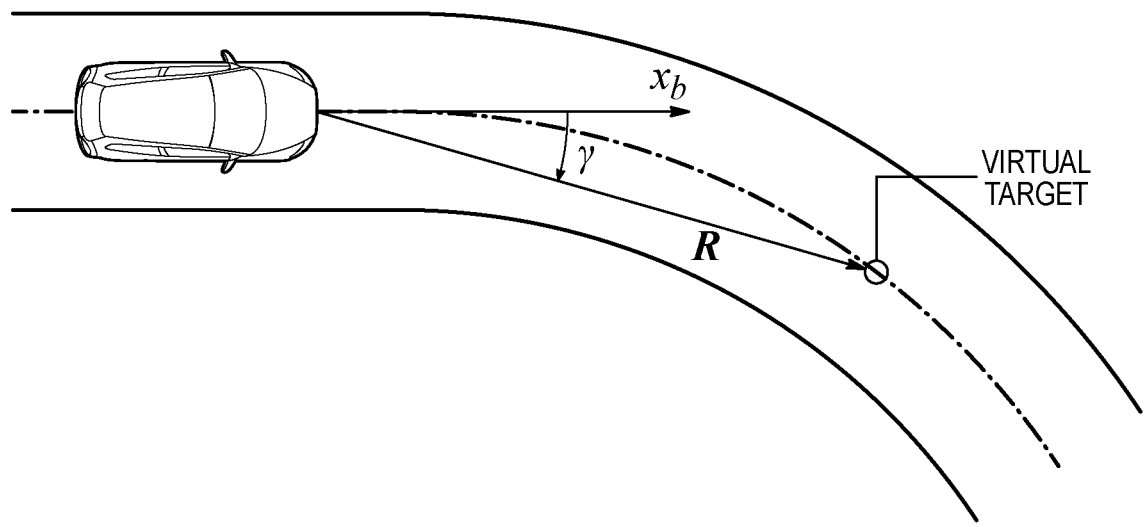
FIG. 10 is a diagrammatic view depicting a positional relationship between a guided vehicle and a virtual target for lane following.

The line-of-sight pure pursuit guidance controller described above may be used for pursuing an uncooperative target without a road constraint. However, the controller can also be used for cooperative pursuing, where the target broadcasts its coordinate $P_{tgt}$ to the pursuer. For neutral pursuit, such as lane keeping, the seeker may designate a virtual target in front of the vehicle, e.g., a point on the center of the lane as depicted in FIG. 10. The line-of-sight angle γ may then be defined as the angle γ between the body frame x-axis $x_b$ and the down-range vector $R_b$.

Figure 11:
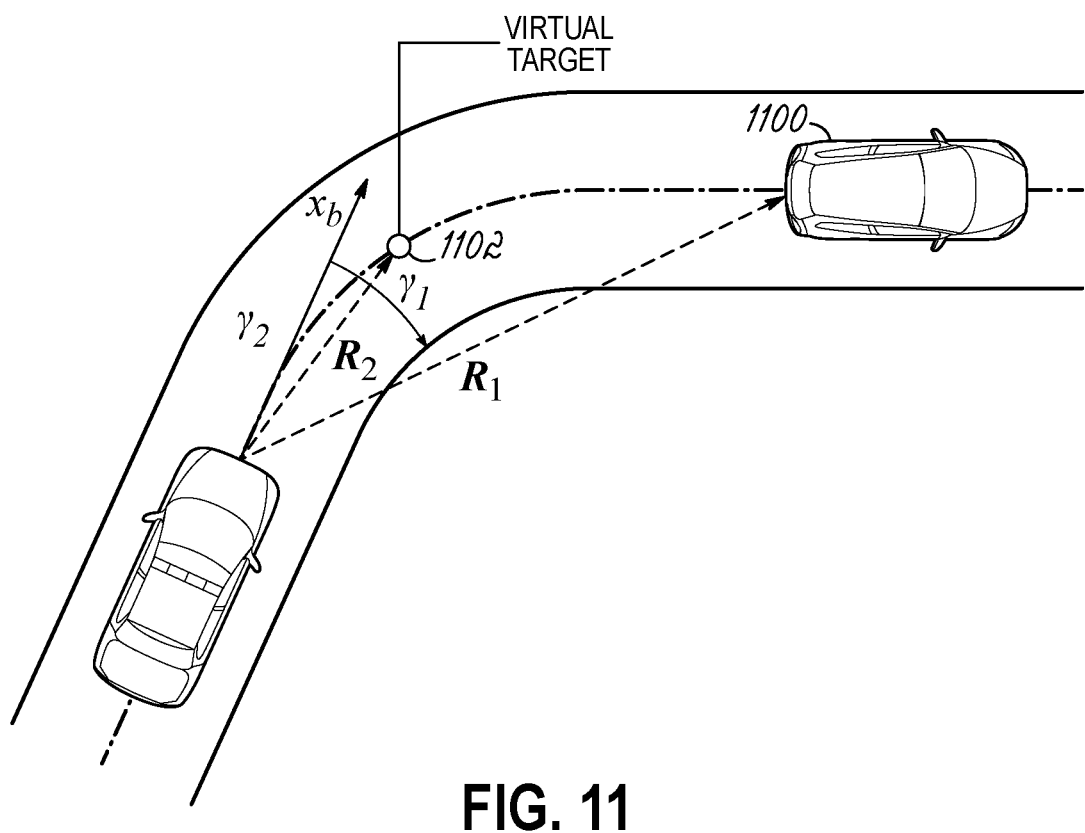
FIG. 11 is a diagrammatic view depicting a positional relationship between a guided vehicle, a virtual target, and a target vehicle for pursuing the target with lane constraints.

FIG. 11 depicts vehicle pursuing with lane constraint. To guide the vehicle to the target, the system may assume two targets in which one target is a real target 1100, and the other target is a virtual target 1102, e.g., a point on the center of the lane, where $\gamma_1$ is the angle between vehicle x-axis with real target down-range vector $R_{b1}$, and $\gamma_2$ is the angle between vehicle x-axis with virtual target down-range vector $R_{b2}$. If $\gamma_{err1} > \gamma_{err2}$ the vehicle chases the virtual target for the lane constraint, otherwise the vehicle chases the real target.

Experimental Results—Trajectory-Tracking Controller

To focus on the motion control issues, and to facilitate validation of the controller design, a 3DOF trajectory-tracking controller was designed for a ⅙ scale DC motor driven car with regenerating braking and servo motor driven steering. The controller for 3DOF car receives a position trajectory command signal, and determines the corresponding voltages for the motor and the steering servo.

TABLE I

Vehicle Modeling Parameters for Test Radio Controlled Vehicle

| Symbol | Parameter | Value | Units |
|---|---|---|---|
| $R_{eff}$ | Effective wheel radius | 0.0725 | m |
| L | Length of the longitudinal axle | 0.7 | m |
| w | Width of the vehicle track | 0.35 | m |
| m | Total mass | 4.76 | kg |
| $I_{zz}$ | Moment of inertia about z-axis | 0.0687 | kg · m² |
| $C_\alpha$ | Total longitudinal tire stiffness | 400 | N/rad |
| $C_{rr}$ | Total tire rolling resistance | 0.02 | |
| $C_\beta$ | Total cornering stiffness | 150 | N/rad |
| $J_m$ | Motor moment of inertia | 5.4e⁻⁵ | kg · m² |
| $B_m$ | Motor viscous friction constant | 0.5e⁻⁵ | Nm/rad |
| $K_m$ | Motor KM constant | 5.15e⁻³ | N · m/A |
| $R_a$ | Total armature resistance | 0.2 | Ω |
| N | Gear Ratio | 1:20 | |

MATLAB® and Simulink®, which are computer applications for data analysis and simulation available from Mathworks, Inc. of Natick, Mass., United States, were used to model the trajectory-tracking controller 300. Using the system parameters in Table I, a vehicle rigid-body model was built using Eqns. 1-4, and a tire traction force model was built using Eqns. 5-7 along with various nonlinear drag forces and actuator models as given by Eqns. 9 and 10. The system parameters in Table I are based on a Traxxas® radio controlled "Monster Truck", which was used as a test vehicle and can be obtained from the Traxxas corporation of McKinney, Tex., United States. The Monster Truck was classified as a ⅒-scale by the manufacturer, but it was about ⅙ of a passenger car, and was treated as a ⅙-scaled car for scaling test speed performance. The scenarios tested included scenarios where the objective was to follow a desired trajectory and maintain a desired velocity. Saturation requirements of $|\delta| \leq 30°$ and $|u| \leq 7$ m/s were also imposed on the trajectory-tracking controller 300.

The controller parameters used in the simulations are shown in Table II. The nominal controller bandwidth, i.e. the natural frequency $\omega_n$ in the pseudo-differentiators, was set based on the maximum response time of the corresponding actuators or maximum allowable bandwidth by the operational requirements. The closed-loop bandwidth, i.e. the natural frequency $\omega_n$ for each closed-loop eigenvalue, was initially set to one third of the bandwidth of the immediate inner loop. All damping ratios were initially set to 0.7. The parameters were then tuned for most desirable performances and transient behaviors.

TABLE II

3DOF Motion Controller Coefficients

| | Guid. Outer Loop | Guid. Inner Loop | Steering Outer Loop | Steering Inner Loop |
|---|---|---|---|---|
| | Nominal Controller | | | |
| ζ | 1.4 | 1.4 | 1.4 | 1.4 |
| $\omega_n$ | 9 | 9 | 14 | 14 |
| | Feedback Controller | | | |
| ζ | [0.7 2.1] | [0.7 1.4] | 0.7 | 0.7 |
| $\omega_n$ | [3 0.9] | [16 4*] | 5 | 17 |

Figure 12:
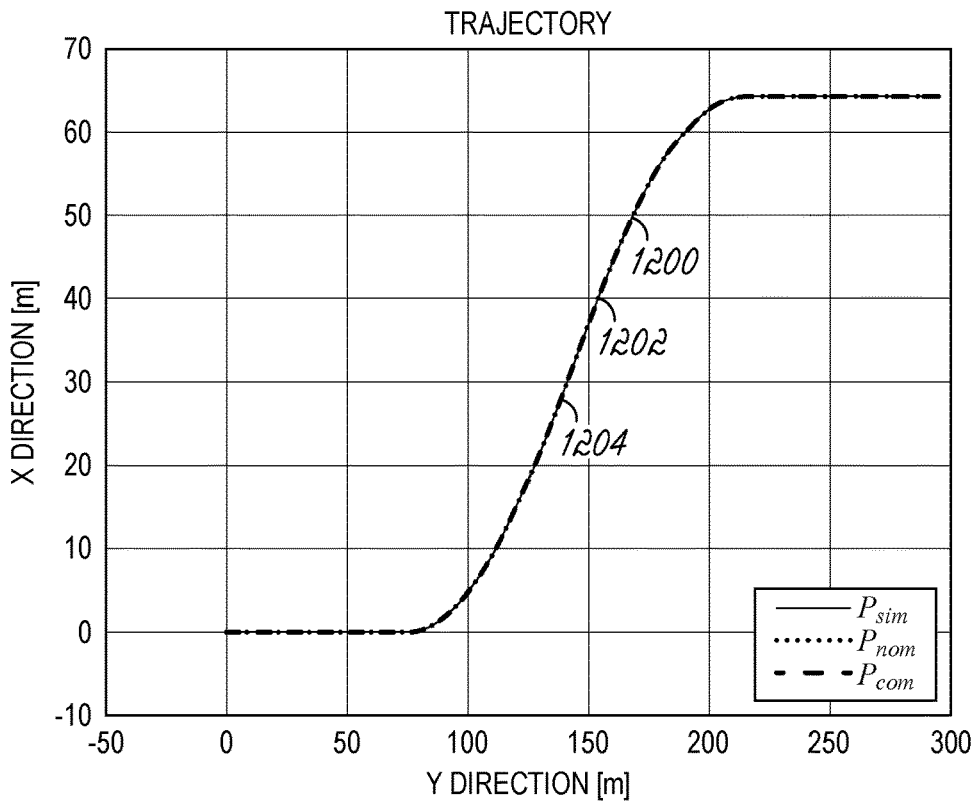
FIG. 12 is a graphical view of a plot depicting an exemplary position trajectory-tracking performance of the trajectory linearization control system in a navigation reference frame.

FIG. 12 depicts plots 1200-1202 that illustrate a two-dimensional view of the position command signal $P_{com}$, the nominal position $P_{nom}$, and the simulated position $P_{sim}$ of the vehicle along the ground in the n-frame. The signals/positions are essentially coextensive with each other since the command signal $P_{com}$ is a feasible trajectory for which the steering and speed saturation constraints are satisfied.

Figure 13:
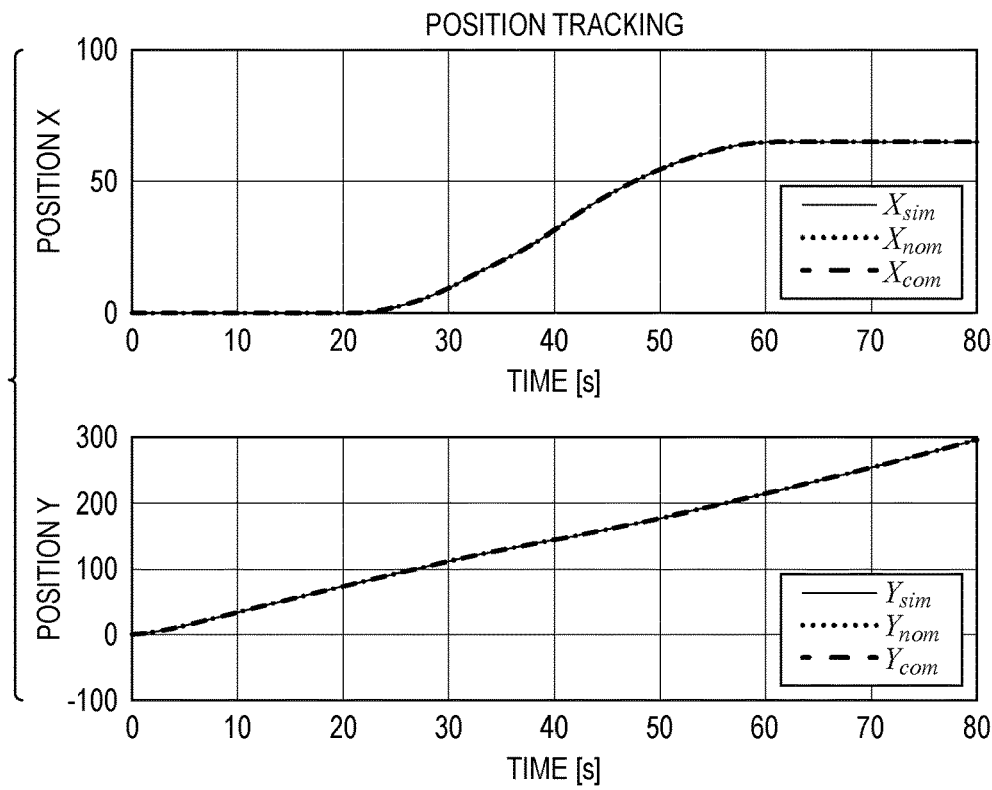
FIG. 13 is a graphical view of a plurality of plots depicting exemplary position tracking performance of the trajectory linearization control system.
Figure 14:
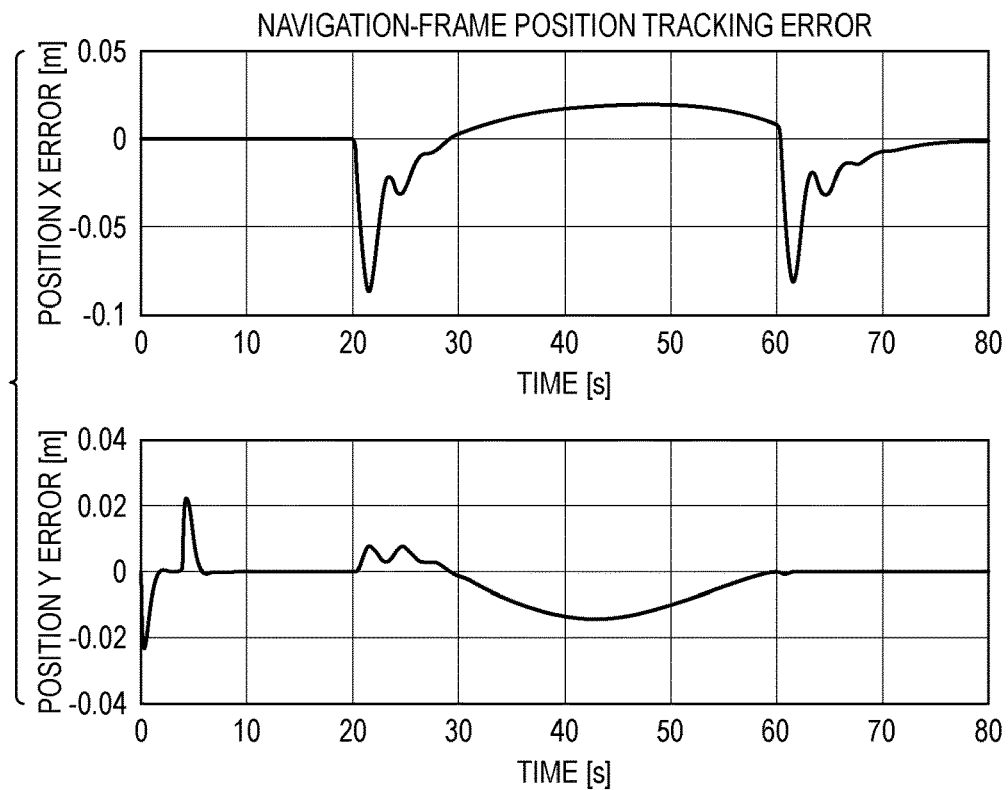
FIG. 14 is a graphical view of a plurality of plots depicting exemplary position tracking errors of the trajectory linearization control system in the navigation reference frame.
Figure 15:
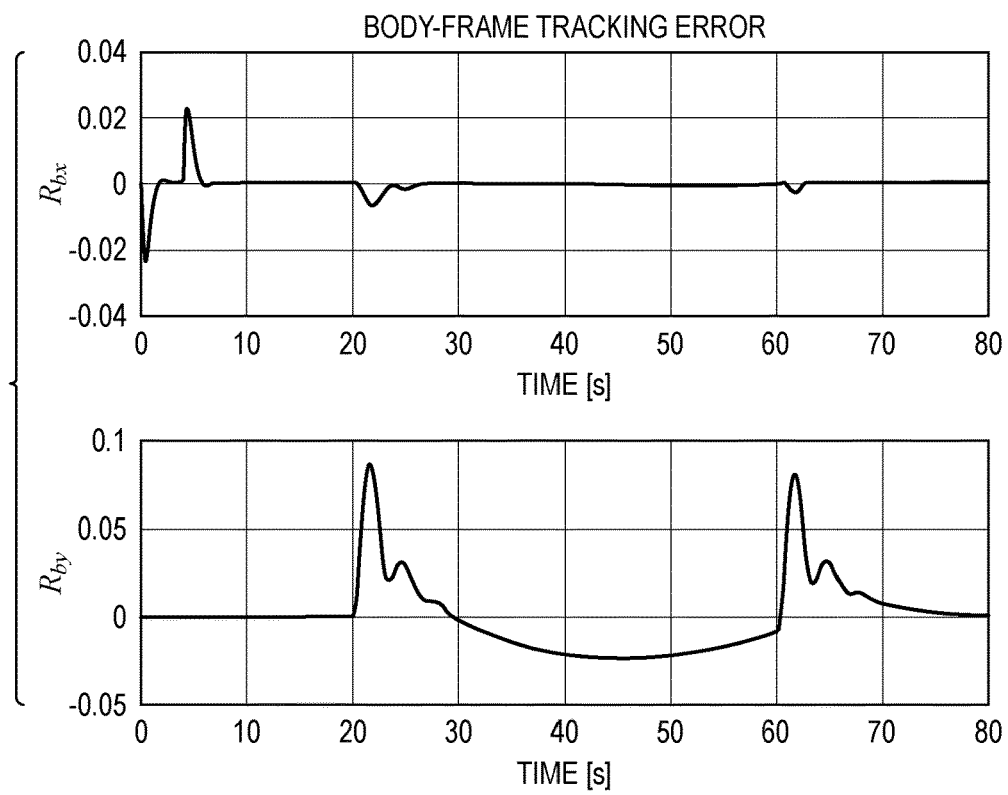
FIG. 15 is a graphical view of a plurality of plots depicting an exemplary position tracking errors of the trajectory linearization control system in a vehicle body-fixed reference frame.

FIG. 13 depicts the simulated position tracking performance of the trajectory-tracking controller 300 for each state variable X and Y. The corresponding tracking errors in the n-frame and b-frame are shown in FIGS. 14 and 15, respectively. The position error $P_{err}$ in the n-frame illustrated in FIG. 14 may be the deviation of the vehicle's current position from the nominal position $P_{nom}$.

Figure 20:
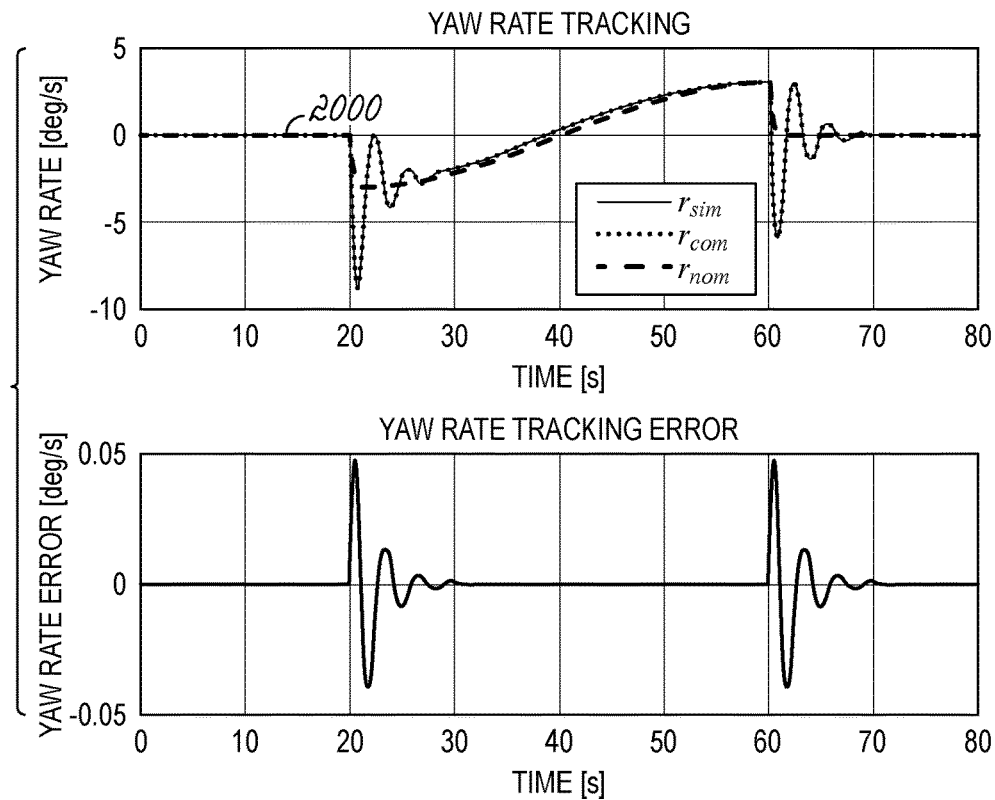
FIG. 20 is a graphical view of a plurality of plots depicting exemplary yaw angular rate tracking and tracking error of the trajectory linearization control system.

The b-frame error is the projection of $P_{err}$ onto the b-frame. FIG. 15 shows that the longitudinal tracking error quickly converges to zero after the vehicle achieves a steady state. The maximum lateral tracking error $R_{by}$ is about 0.09 m at about 21 seconds and 61 seconds, which is approximately 26% of the track width of the test vehicle. These errors may be due to the large turning rate and angular acceleration when the path has a sharp turn, as shown by the yaw rate plot 2000 depicted in FIG. 20 at about 21 and 61 seconds.

Figure 16:
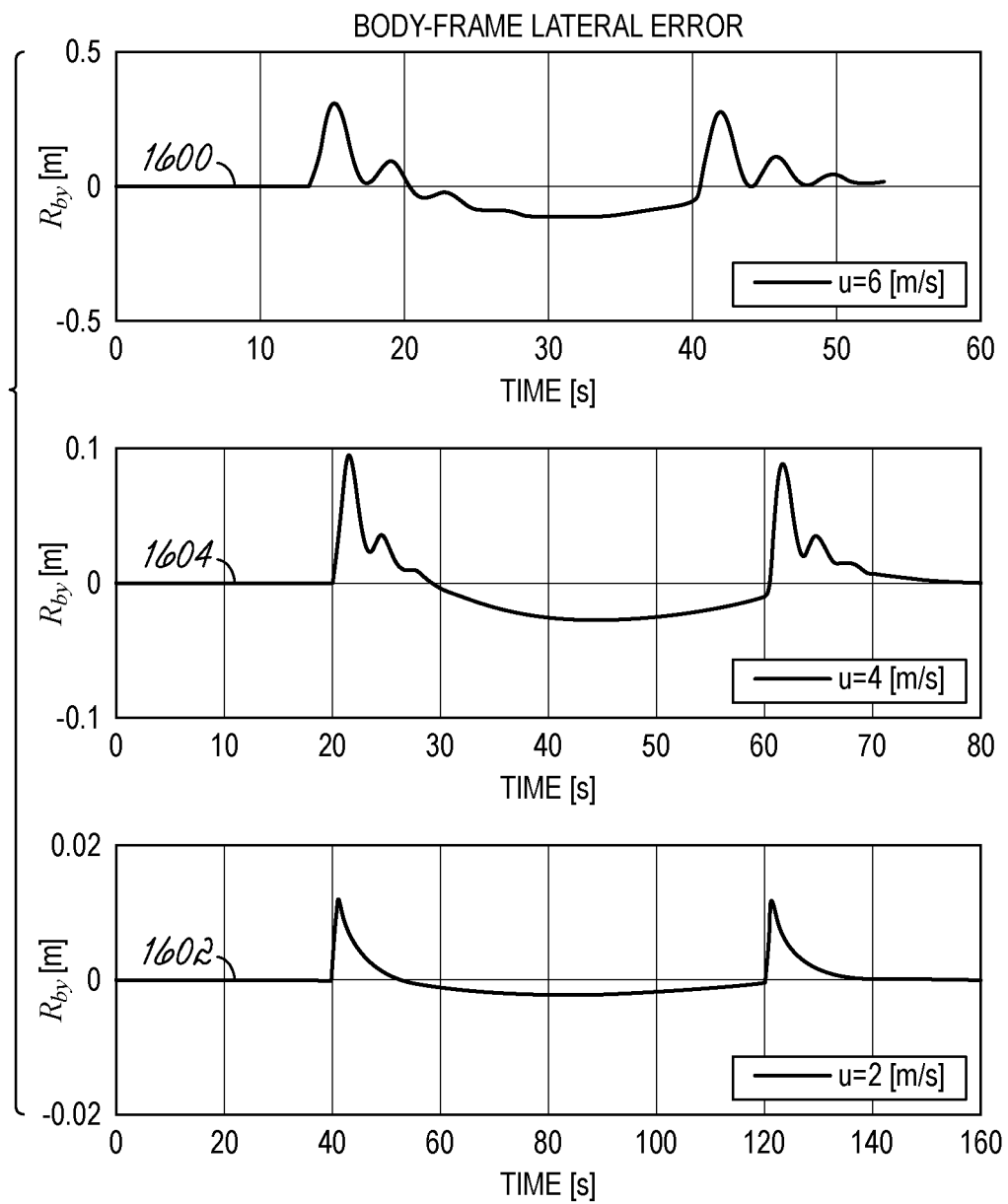
FIG. 16 is a graphical view of a plurality of plots depicting exemplary lateral position errors at different scaled speeds for the trajectory linearization control system.
Figure 17:
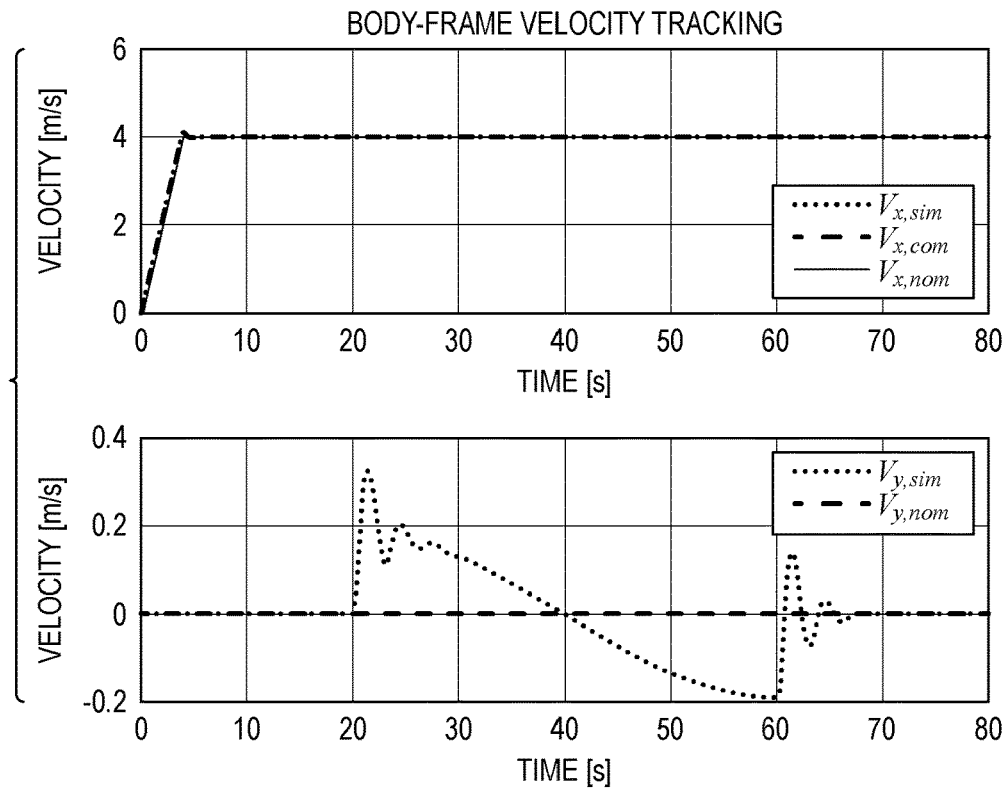
FIG. 17 is a graphical view of a plurality of plots depicting exemplary velocity tracking of the trajectory linearization control system in the vehicle body-fixed reference frame.
Figure 18:
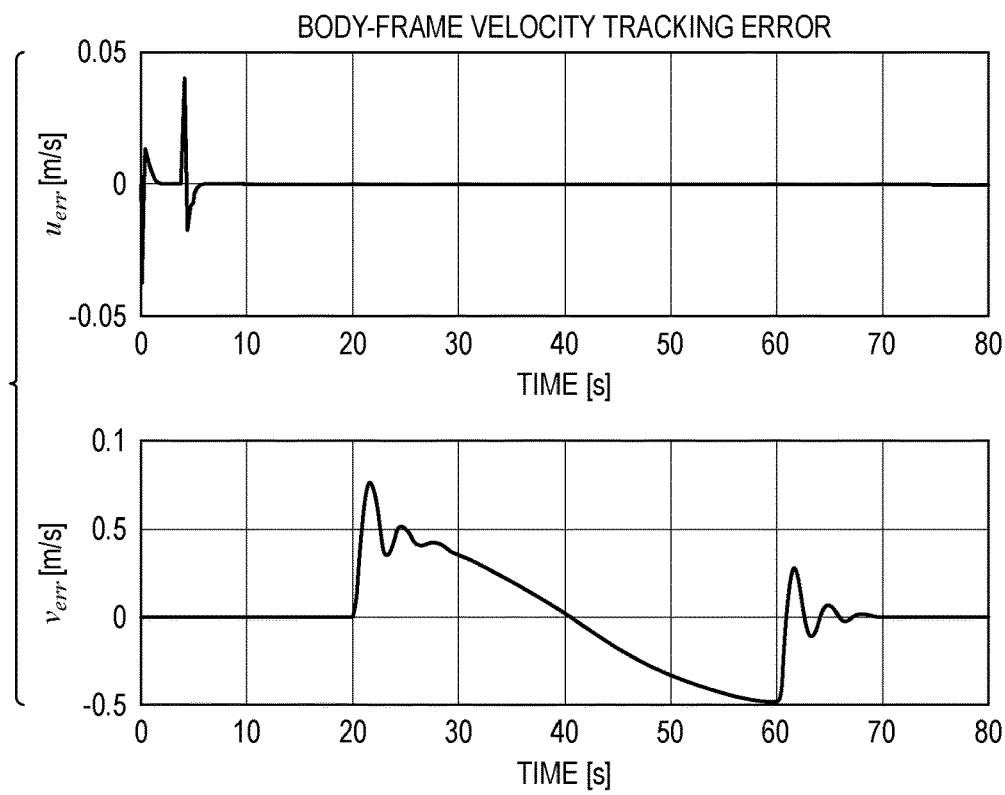
FIG. 18 is a graphical view of a plurality of plots depicting exemplary velocity tracking error of the trajectory linearization control system in the vehicle body-fixed reference frame.
Figure 19:
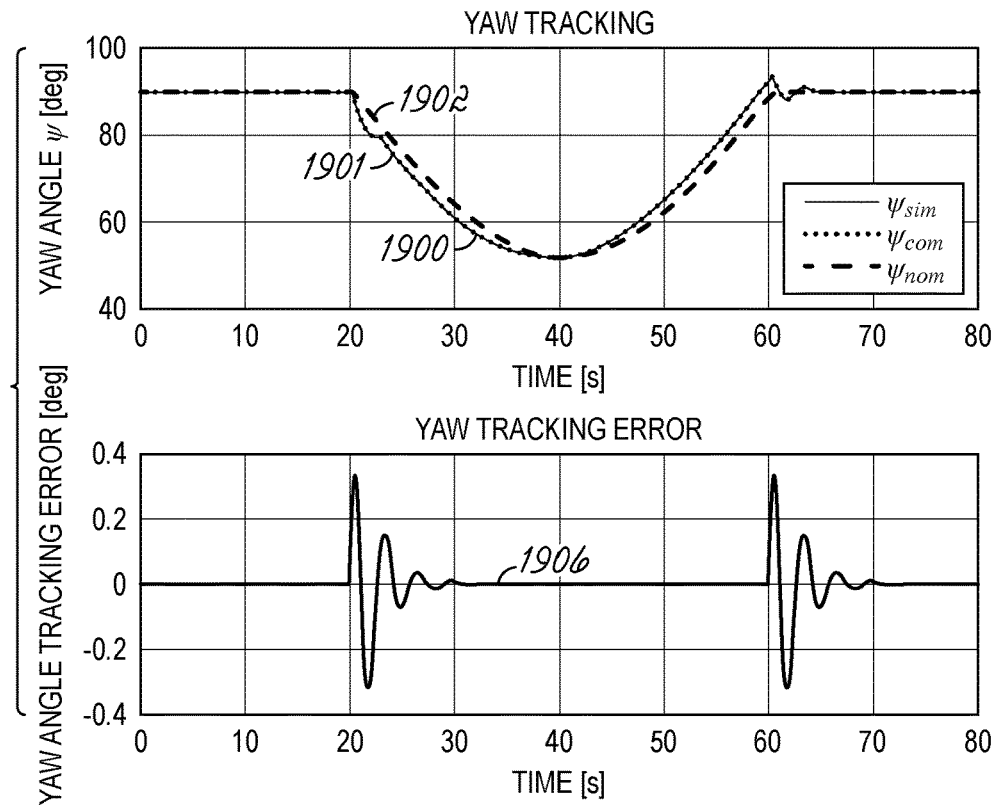
FIG. 19 is a graphical view of a plurality of plots depicting exemplary yaw tracking and yaw tracking error of the trajectory linearization control system.
Figure 21A:
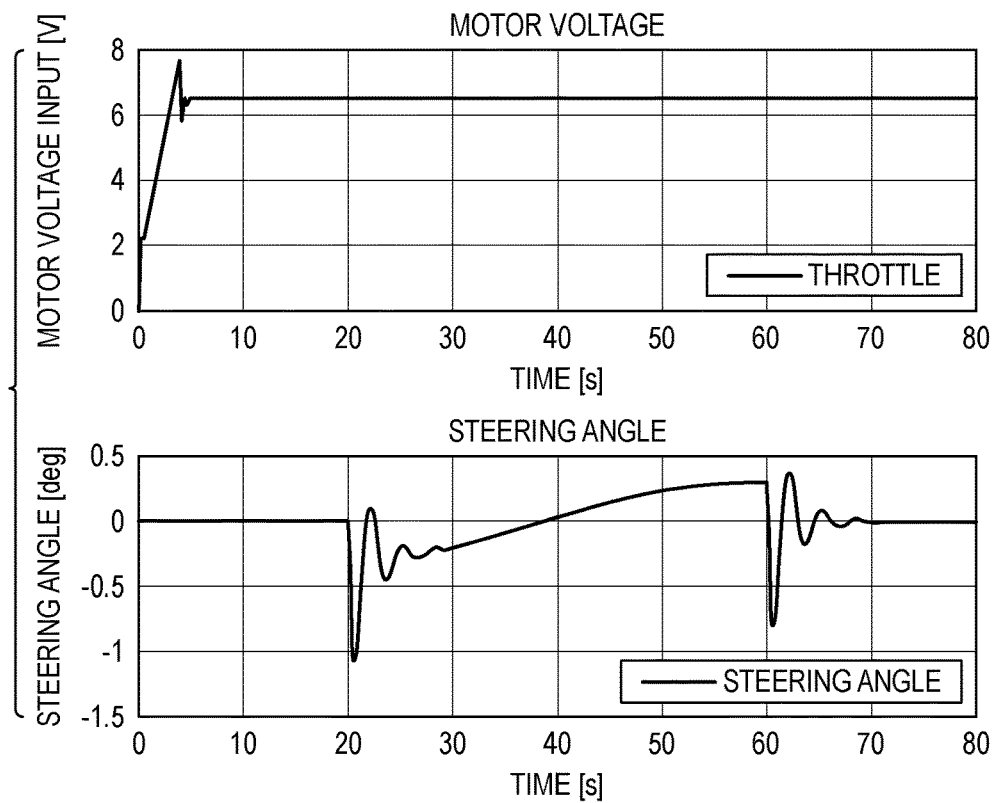
FIG. 21A is a graphical view of a plurality of plots depicting exemplary motor voltage and steering angle actuator signals.
Figure 21B:
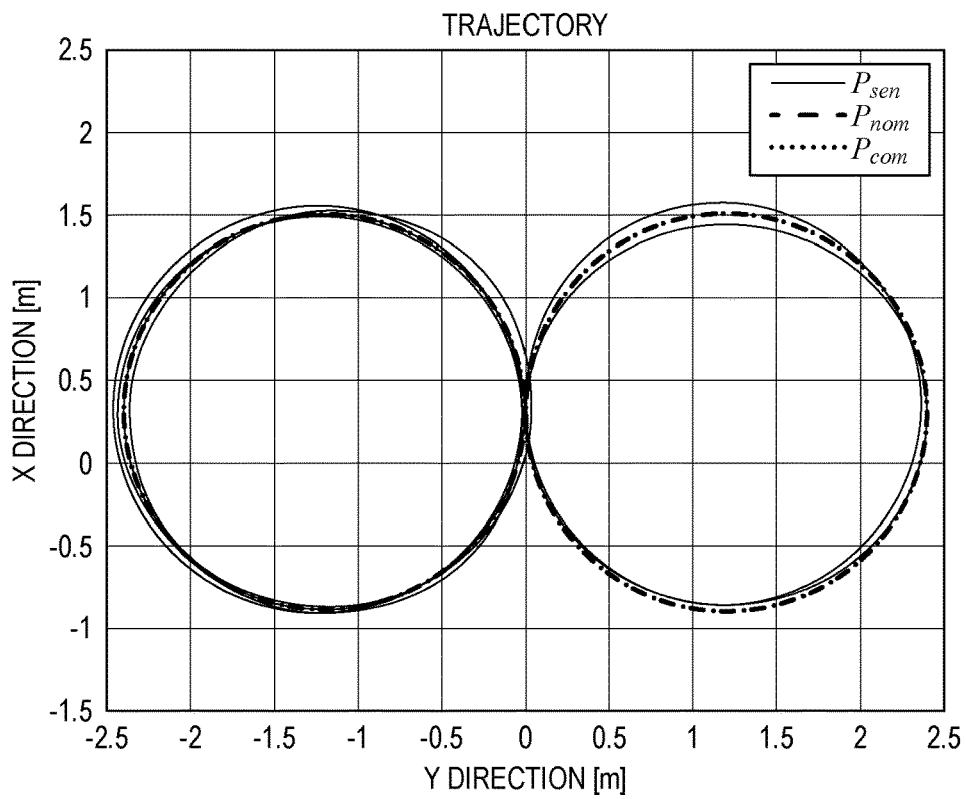
FIG. 21B is a graphical view of a figure-8 trajectory that may be tracked by the car-like ground vehicle.

In general, higher speed may cause larger lateral tracking errors at turns. FIG. 16 may explain this phenomenon. Driving the vehicle at 6 m/s brings the maximum lateral tracking error up to 0.3 m (86% track width) as indicated by plot 1600, while u=2 m/s reduces the maximum tracking error to 0.01 m (3% track width) as indicated by plot 1602. The test trajectory required the ⅙-scale test vehicle to drive with u=4 m/s (see plot 1604), which would be about 54 mph for a full-size car. FIG. 17 shows the velocity tracking in the b-frame, and the corresponding tracking error is shown in FIG. 18. The directional tracking performance is shown by plots 1900-1902 in FIG. 19, with the corresponding tracking error depicted by plot 1906. The difference between $\psi_{com}$ and $\psi_{nom}$ may be explained by the vehicle side slip angle $\beta$. The angular rate tracking is presented in FIG. 20. FIG. 21 depicts the actuator signals for the DC motor and electrical servo, which are smooth and well within the saturation limits.

Hardware implementation and testing has been performed using the above described model vehicle. The controller parameters and a test case of tracking a figure-8 trajectory is shown below in Table III and FIG. 21B, respectively. The test was done with onboard sensors only, without any global referencing sensors such as cameras, beacons or GPS. The angular velocity and yaw angle were measured with an onboard MEMS gyroscope with maximum angular rate of 1 rad/sec. The b-frame velocity and relative position were measured with an onboard accelerometer and a motor shaft encoder. An extended Kalman filter was employed to fuse the accelerometer and encoder data. The trajectory is the smallest circle and the largest angular rate the hardware was capable of. The vehicle started from zero velocity from the origin of the navigation reference frame. The results are unexpectedly accurate and smooth for onboard sensors only.

Embodiments of the invention described above include a 3DOF trajectory-tracking controller design for a nonlinear, nonholonomic, car-like ground vehicle using TLC. The simulation results show that the vehicle can track a feasible trajectory with good performance. This is believed to be the first TLC controller for nonholonomic vehicle trajectory-tracking. The experimental results demonstrate a TLC controller that provides an effective alternative to MPC and other car controllers. The performance of the TLC controller may be further improved by considering sensor errors, dynamics, and noise; the deformable connection between the vehicle body and wheels; and the rolling and pitching motions, tire skidding and vehicle stability.

Experimental Results for Line-of-Sight Pure Pursuit Guidance

A line-of-sight pure pursuit guidance controller in accordance with the above description was implemented and simulated using MATLAB/Simulink. The ⅙-scale Traxxas remotely-controlled model car described above was used to gather experimental data with the line-of-sight pure pursuit guidance controller. The parameters used in the speed guidance controller were $\zeta=0.7$, $\omega_{nx}=3$ rad/sec, and $\omega_{ny}=5.5$ rad/sec. Additional parameters used to obtain the experimental results are shown in Table II.

TABLE II

PID Parameters for LOS PPG Test Radio Controlled Vehicle

| Module | $K_P$ | $K_i$ | $K_D$ |
| --- | --- | --- | --- |
| Heading | 0.4909 | 0.7 | 0 |
| Driving | 0.15 | 0.0056 | 0 |

Figure 22:
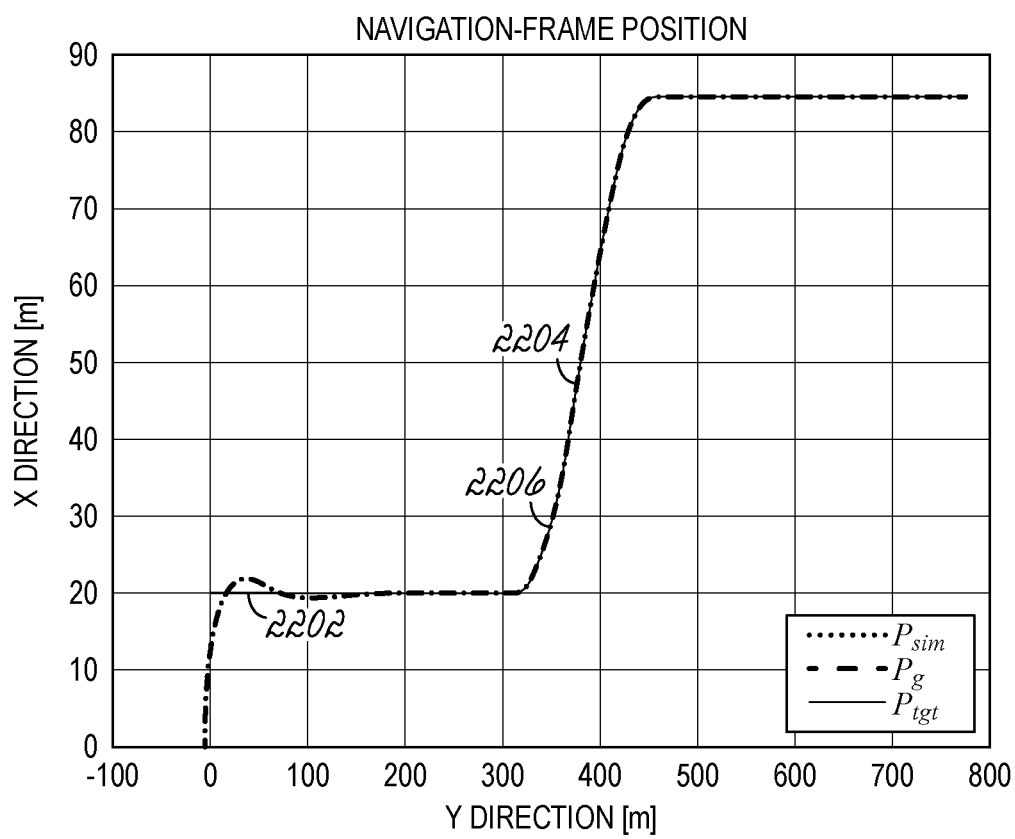
FIG. 22 is a graphical view of a plot depicting an exemplary trajectory-tracking in a navigation reference frame for an S-shaped motion target using a line-of-sight based pure-pursuit guidance system.
Figure 23:
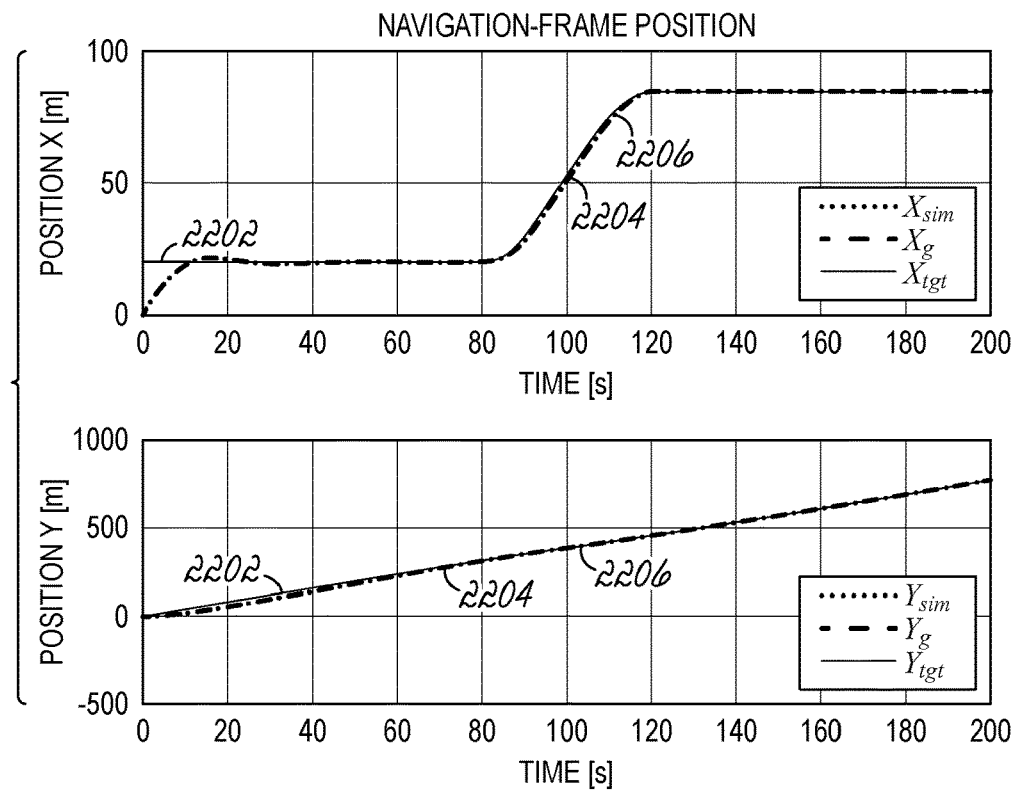
FIG. 23 is a graphical view of a plurality of plots depicting the x-axis and y-axis position of the test vehicle in the navigation reference frame for the S-shaped motion target of FIG. 22.

FIGS. 22-30 depict the MATLAB/Simulink simulation results. In the simulation, $R_{set}=1.5$ m, and the controller response time $\tau=0.5$ s. FIG. 22 depicts a 2-dimensional trajectory shown in the n-frame, and FIG. 23 depicts the position tracking result. The target was initialized at 20 meters to the North of the origin with a speed of 4 m/s towards the east along a straight-S-straight trajectory to demonstrate the tracking performance under straight and turning conditions. The controlled vehicle was initialized to accelerate from 0 m/s at the origin towards the north. The solid line plot 2202 represents the target trajectory, the dash line plot 2204 represents the pure pursuit guidance generated trajectory, and the dash-dot line plot 2206 represents the chasing vehicle trajectory.

Figure 24:
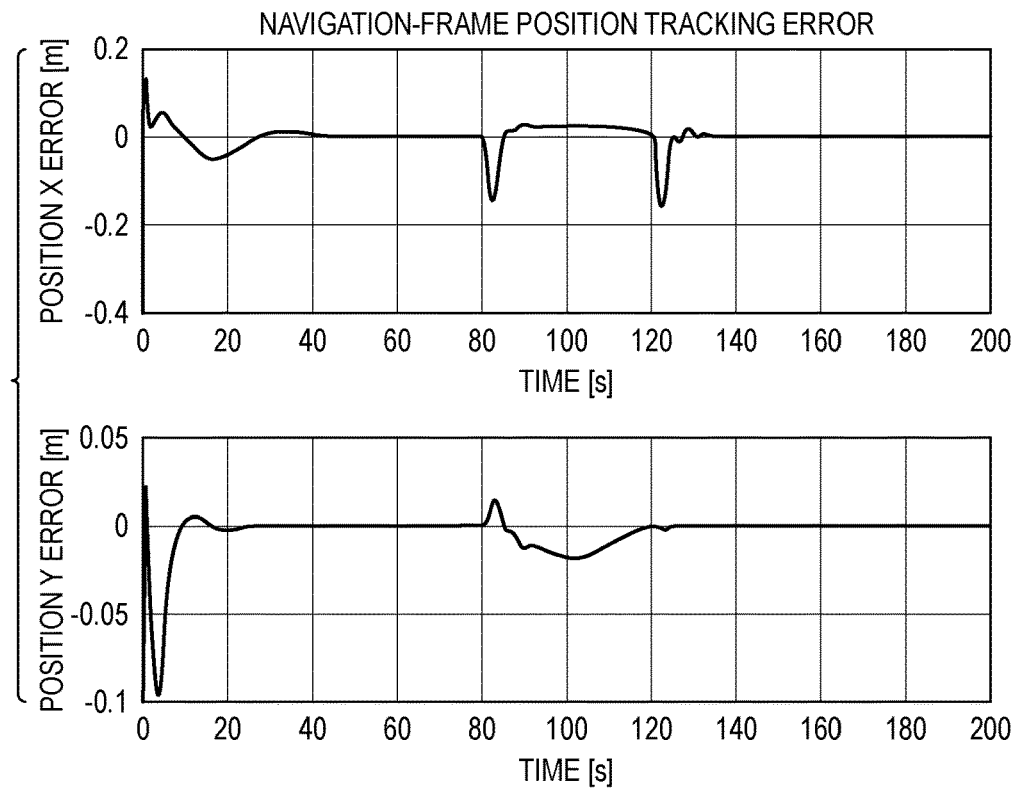
FIG. 24 is a graphical view of a plurality of plots depicting the position tracking error in the navigation reference frame for the S-shaped motion target of FIG. 22.
Figure 25:
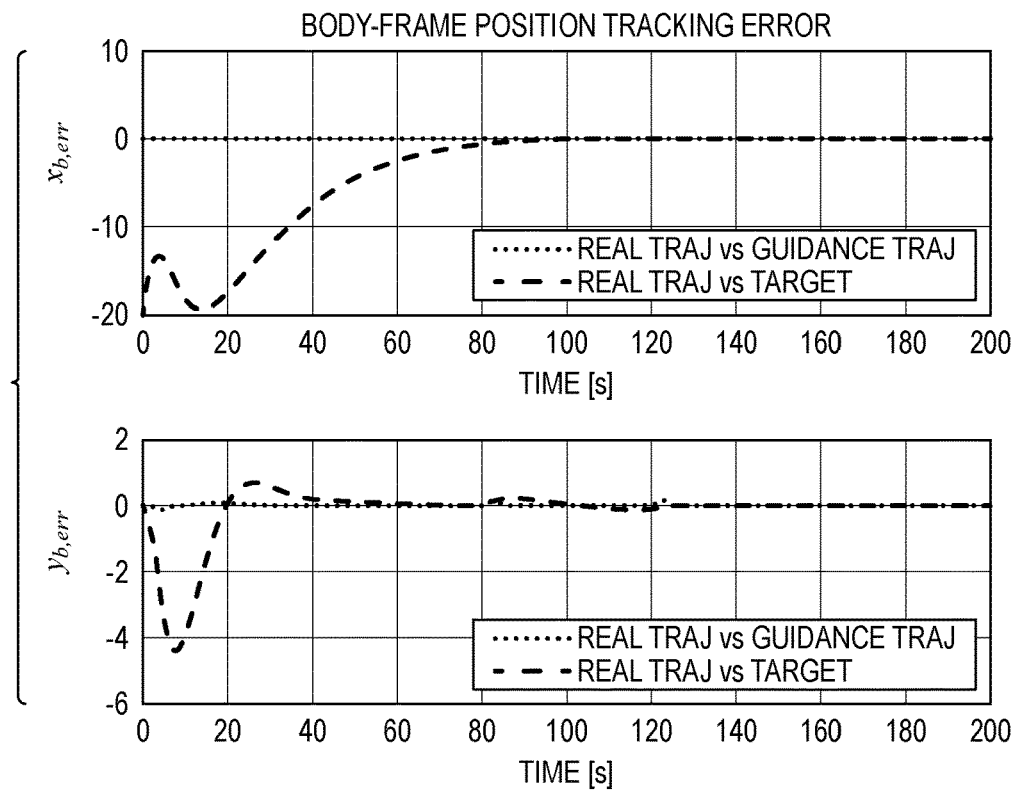
FIG. 25 is a graphical view of a plurality of plots depicting the position tracking error in the vehicle body reference frame for the S-shaped motion target of FIG. 22.
Figure 26A:
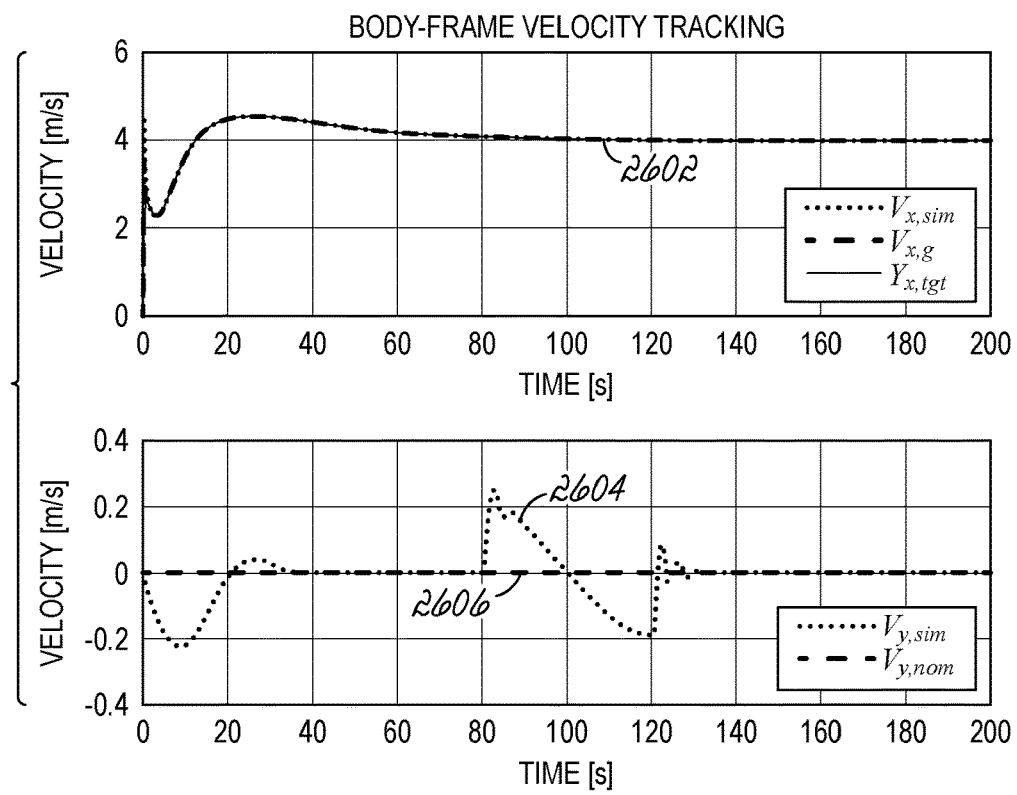
FIG. 26A is a graphical view of a plurality of plots depicting the velocity tracking of the test vehicle in the vehicle body reference frame for the S-shaped motion target of FIG. 22.
Figure 26B:
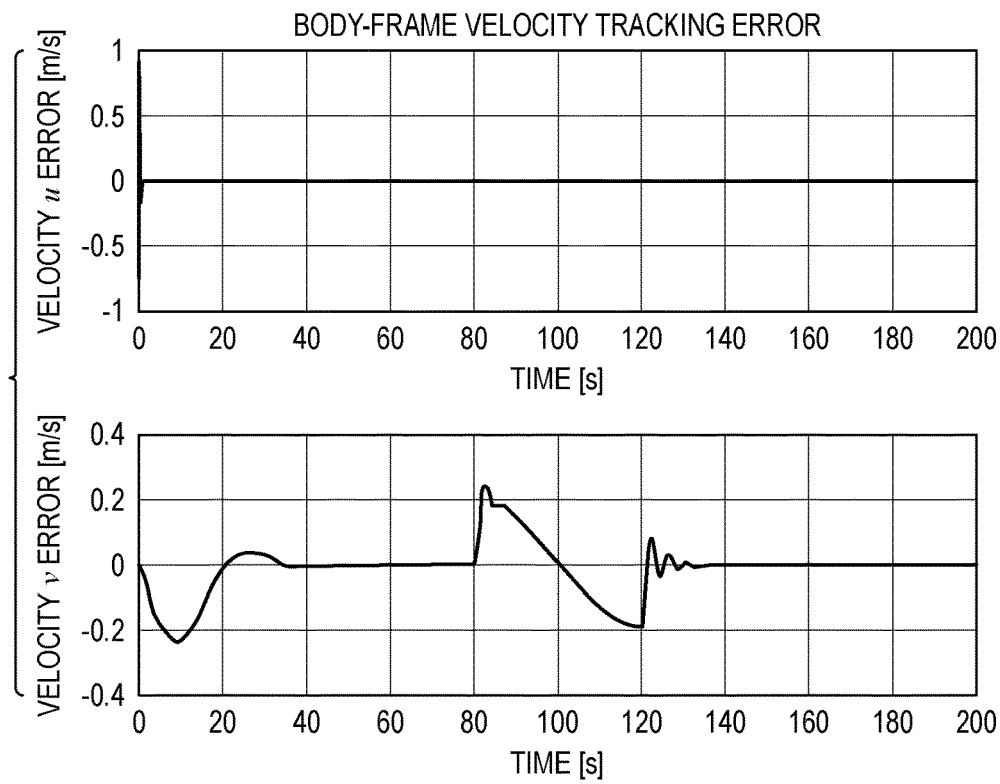
FIG. 26B is a graphical view of a velocity tracking error of the test vehicle in the vehicle body reference frame for the S-shaped motion target of FIG. 22.
Figure 26C:
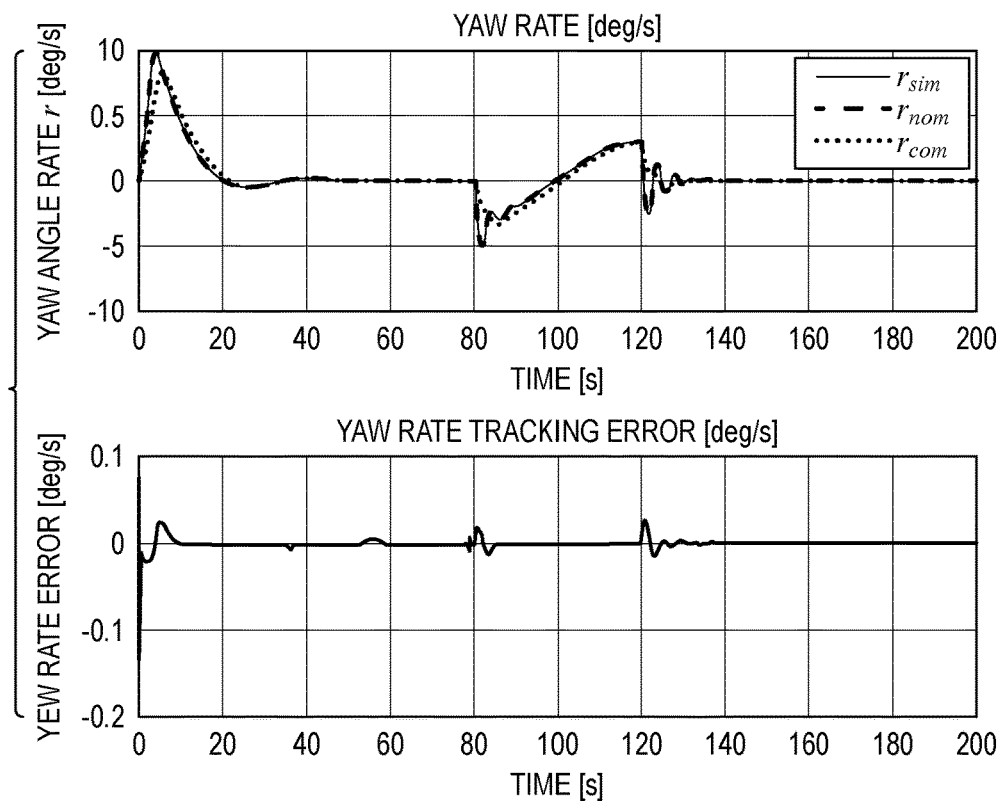
FIG. 26C is a graphical view of a yaw angle rate of the test vehicle in the vehicle body reference frame for the S-shaped motion target of FIG. 22.
Figure 31:
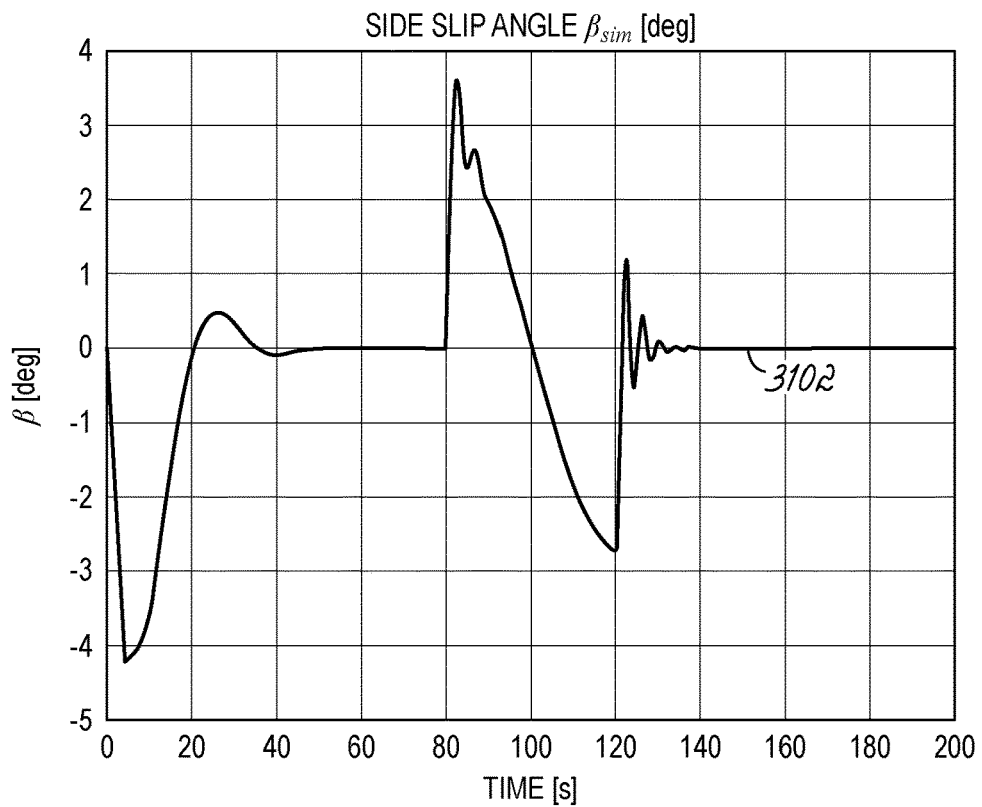
FIG. 31 is a graphical view of a plot depicting the slideslip angle of the test vehicle for the S-shaped motion target of FIG. 22.

FIG. 24 depicts the n-frame tracking error, and FIG. 25 depicts the b-frame tracking error. FIG. 26 shows the body frame velocity tracking, which demonstrates a difference between the trajectory-tracking and path-following. The longitudinal velocity tracking plot 2602 is smooth, whereas the lateral velocity tracking plot 2604 shows some oscillatory transients 2606 which correspond to a small sideslip angle $\beta$, as shown in FIG. 31, that effects the centripetal acceleration required and yaw moment for the S-turns. The ⅙-scale vehicle was started with an initial speed of 0 m/s, and acquired the target speed of 4 m/s at around 60 seconds, which is equivalent to 24 m/s, or 54 mph for a full-size car. FIG. 26B depicts the body frame velocity tracking error $V_{err}$, and FIG. 26C depicts yaw rate and yaw rate tracking error.

Figure 27:
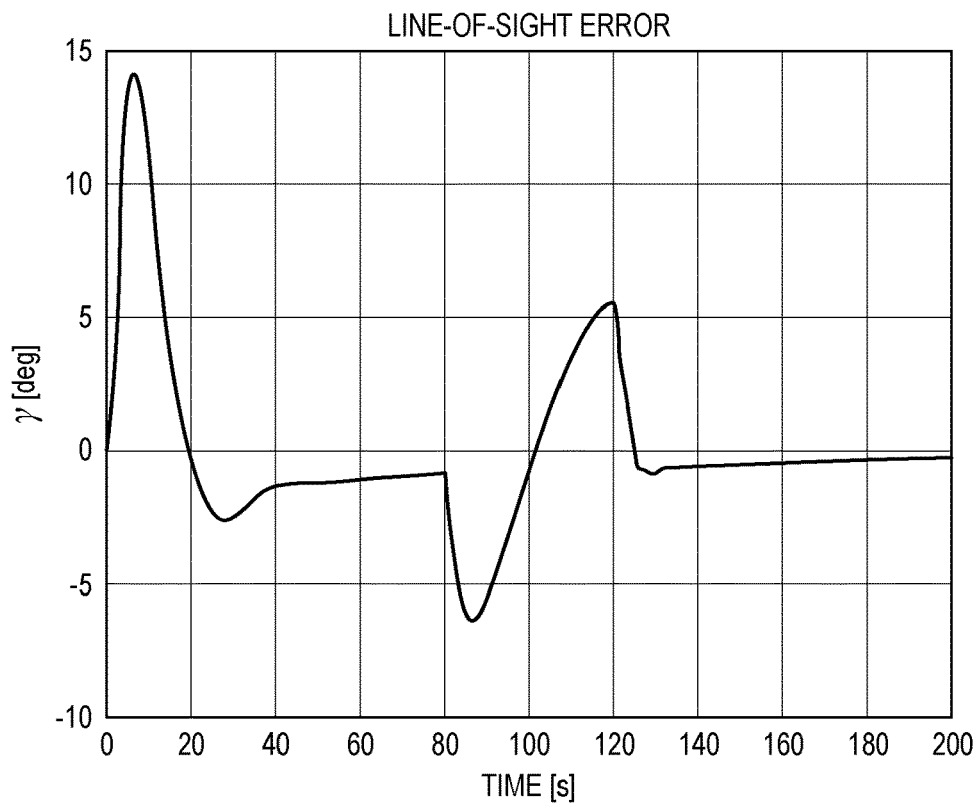
FIG. 27 is a graphical view of a plurality of plots depicting the line-of-sight angle of the test vehicle for the S-shaped motion target of FIG. 22.
Figure 28:
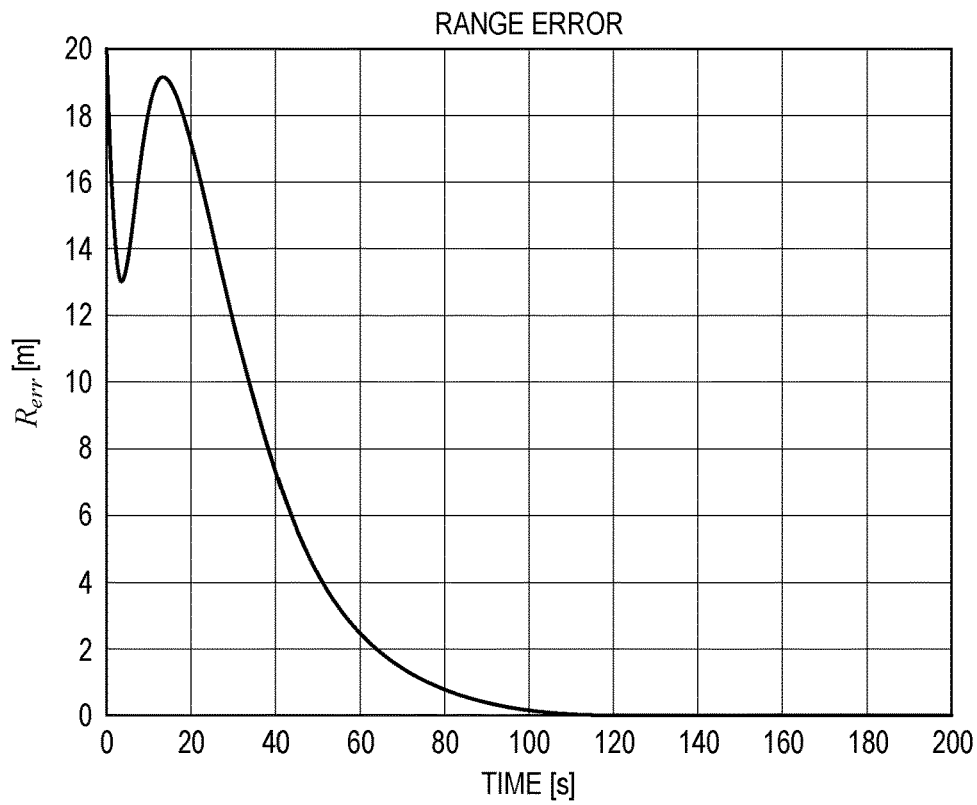
FIG. 28 is a graphical view of a plot depicting the range error of the test vehicle in the body reference frame for the S-shaped motion target of FIG. 22.
Figure 29:
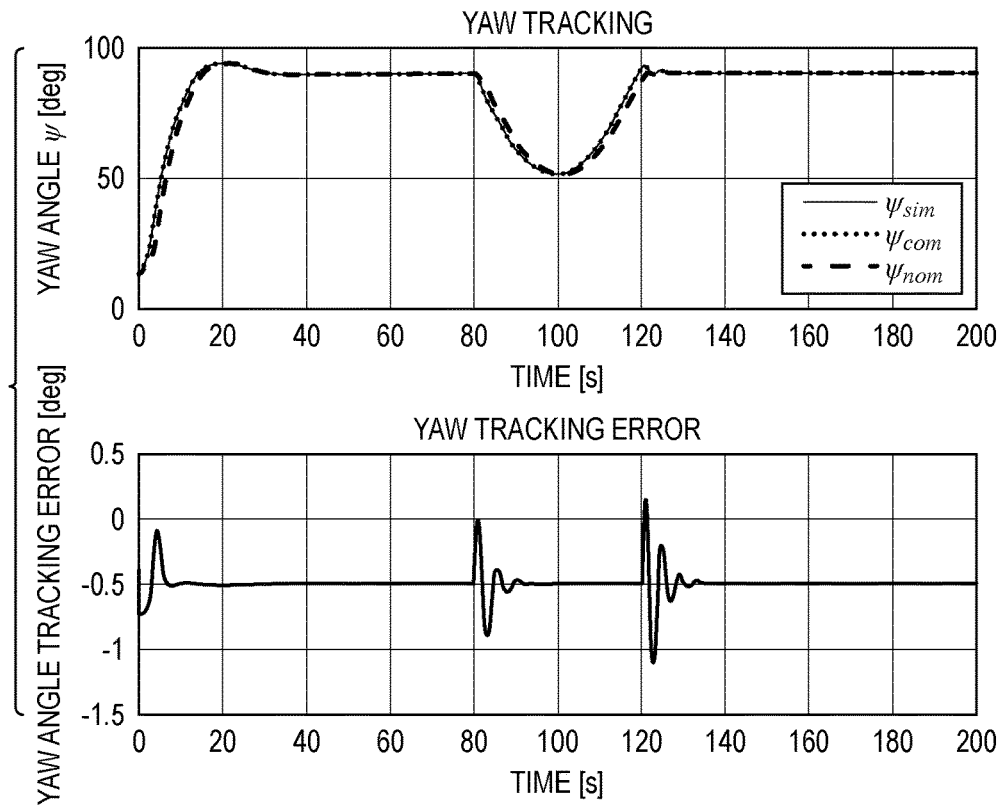
FIG. 29 is a graphical view of a plurality of plots depicting exemplary yaw angle and yaw angle tracking error of the test vehicle for the S-shaped motion target of FIG. 22.
Figure 30:
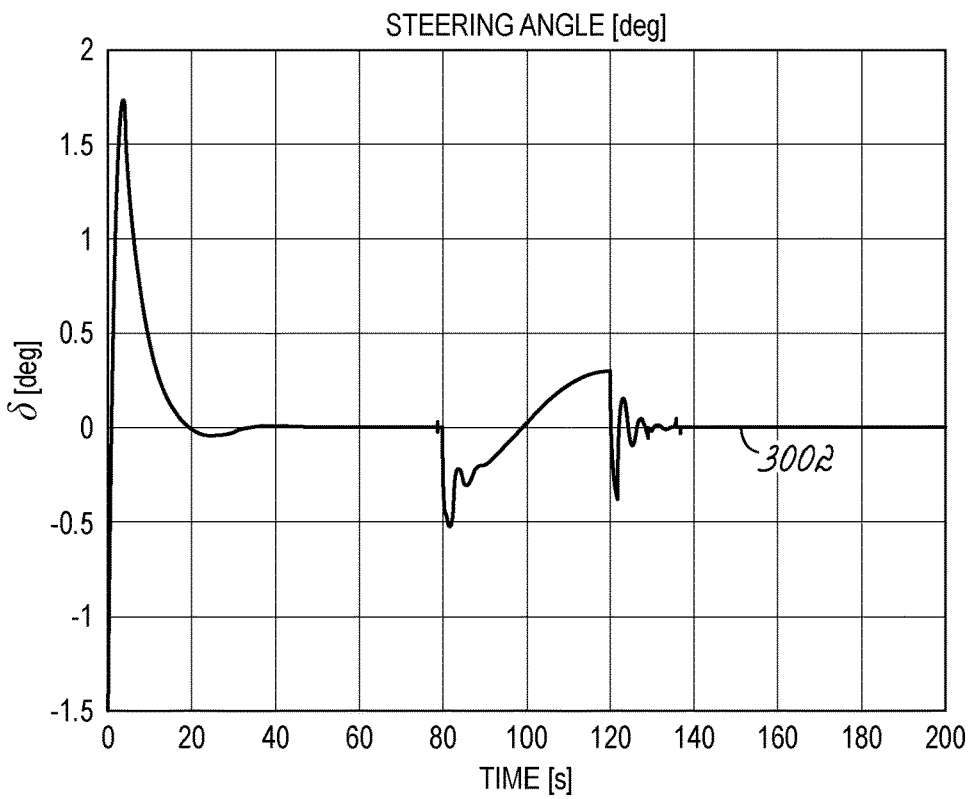
FIG. 30 is a graphical view of a plot depicting the steering angle of the test vehicle for the S-shaped motion target of FIG. 22.

FIGS. 27 and 28 show line-of-sight error $\gamma$ and range error $R_{err}$, respectively. Both $\gamma$ and $R_{err}$ converge to 0, which fulfills a guidance objective. FIG. 29 depicts the yaw angle $\psi$ tracking with a corresponding tracking error. FIG. 30 depicts a plot 3002 showing the vehicle steering angle $\delta$ plotted with respect to time. Generally, plot 3002 indicates that the turning is smooth. FIG. 31 depicts a plot 3102 showing the sideslip angle $\beta$ with respect to time.

Figure 32:
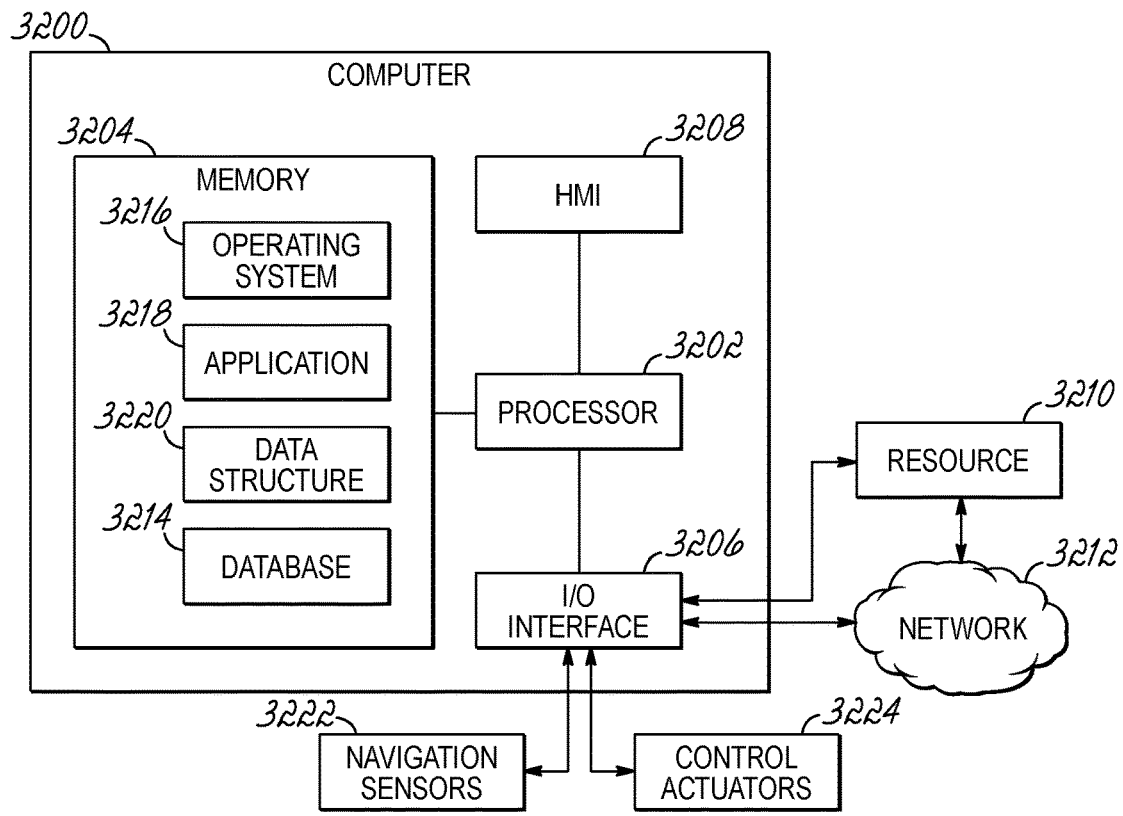
FIG. 32 is a schematic view of an exemplary computing system that may be used to implement one or more of the controllers, modules, or systems of FIGS. 1-31.

Referring now to FIG. 32, embodiments of the invention described above may be implemented using one or more computer devices or systems, such as exemplary computer system 3200. The computer system 3200 may include a processor 3202, a memory 3204, an input/output (I/O) interface 3206, and a Human Machine Interface (HMI) 3208. The computer system 3200 may also be operatively coupled to one or more external resources 3210 via the I/O interface 3206 and/or a network 3212. The computer may be configured to support real-time communication channels to control actuators 3222 and navigation sensors 3224.

The processor 3202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 3204. Memory 3204 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The memory 3204 may also include data storage devices such as a hard drive, optical drive, tape drive, non-volatile solid state device, or any other device capable of storing information. A database 3214 may reside in memory 3204, and may be used to collect and organize data used by the various systems and modules described herein.

Processor 3202 may operate under the control of an operating system 3216 that resides in memory 3204. The operating system 3216 may manage computer resources so that computer program code embodied as one or more computer software applications, such as application 3218 residing in memory 3204, may have instructions executed by the processor 3202. The operating system 3216 may be a real-time operating system that process data as it comes in with little or no buffer delays, and that has well-defined and consistent time constraints. In an alternative embodiment, the processor 3202 may execute the applications 3218 directly, in which case the operating system 3216 may be omitted. One or more data structures 3220 may also reside in memory 3204, and may be used by the processor 3202, operating system 3216, and/or application 3218 to store and/or manipulate data.

The I/O interface 3206 may provide a machine interface that operatively couples the processor 3202 to other devices and systems, such as the network 3212 and/or external resource 3210. The application 3218 may thereby work cooperatively with the network 3212 and/or external resource 3210 by communicating via the I/O interface 3206 to provide the various features, functions, and/or modules comprising embodiments of the invention. The application 3218 may also have program code that is executed by one or more external resources 3210, or otherwise rely on functions and/or signals provided by other system or network components external to the computer system 3200. Indeed, given the nearly endless hardware and software configurations possible, persons having ordinary skill in the art will understand that embodiments of the invention may include applications that are located externally to the computer system 3200, distributed among multiple computers or other external resources 3210, or provided by computing resources (hardware and software) that are provided as a service over the network 3212, such as a cloud computing service.

The HMI 3208 may be operatively coupled to the processor 3202 of computer system 3200 to allow a user to interact directly with the computer system 3200. The HMI 3208 may include video and/or alphanumeric displays, a touch screen, a speaker, and any other suitable audio and visual indicators capable of providing information to the user. The HMI 3208 may also include input devices and controls such as an alphanumeric keyboard, a pointing device, keypads, pushbuttons, control knobs, microphones, etc., capable of accepting commands or input from the user and transmitting the entered input to the processor 3202.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, web based services, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of automatically guiding and controlling a car-like ground vehicle, the method comprising:
   receiving a position command signal indicative of a guidance trajectory for the car-like ground vehicle at a guidance controller including a first open-loop nominal controller and a first closed-loop tracking error controller;
   receiving a position measurement signal indicative of a position of the car-like ground vehicle at the guidance controller;
   determining, by the first open-loop nominal controller, a nominal velocity signal based on the position command signal;
   determining, by the first closed-loop tracking error controller, a velocity control signal based on a difference between the position command signal and the position measurement signal;
   determining, by the guidance controller, a velocity command signal based on the nominal velocity signal and the velocity control signal;
   determining, by the guidance controller, a drive command signal based on the velocity command signal; and
   transmitting the drive command signal to a drive actuator of the car-like ground vehicle.

2. The method of claim 1 wherein the velocity control signal includes a lateral velocity control signal, and further comprising:
   determining a yaw control signal based on a longitudinal component of the nominal velocity signal and the lateral velocity control signal; and
   transmitting the yaw control signal to a steering controller.

3. The method of claim 1 wherein the velocity command signal includes a longitudinal velocity command signal, and determining the drive command signal comprises:
   determining the difference between a longitudinal velocity measurement signal and the longitudinal velocity command signal to generate a longitudinal velocity error signal;
   determining, by a second closed-loop tracking error controller of the guidance controller, a longitudinal force control signal based on the longitudinal velocity error signal; and
   determining the drive command signal based on the longitudinal force control signal.

4. The method of claim 3 wherein determining the drive command signal further comprises:
   determining, by a second open-loop nominal controller, a nominal force signal; and
   determining the drive command signal based on the nominal force signal and a tire traction force model.

5. The method of claim 4 further comprising:
   determining a nominal drive signal based on the nominal force signal;
   determining a nominal yaw signal based on the nominal force signal;
   receiving the nominal yaw signal at a steering controller including a third open-loop nominal controller;
   determining, by the third open-loop nominal controller, a nominal yaw angular rate signal based on the nominal yaw signal; and
   determining, by the steering controller, a steering angle command signal based on the nominal yaw angular rate signal.

6. The method of claim 5 wherein the steering controller further includes a third closed loop tracking error controller, and further comprising:
   receiving a yaw tracking error signal at the third closed loop tracking error controller;
   determining, by the third closed loop tracking error controller, a yaw angular rate control signal based on the yaw tracking error signal; and
   determining, by the steering controller, the steering angle command signal based on the yaw angular rate control signal.

7. The method of claim 6 wherein the steering controller includes a fourth closed-loop tracking error controller and fourth open-loop nominal controller, and determining the steering angle command signal comprises:
   receiving, at the steering controller, a yaw angular rate measurement signal;
   determining a yaw angular rate command signal based on the difference between the nominal yaw angular rate signal and the yaw angular rate control signal;
   determining a yaw angular rate error signal based on the difference between the yaw angular rate command signal and the yaw angular rate measurement signal;

determining, by the fourth closed-loop tracking error controller, a body torque control signal based on the yaw angular rate error signal;
determining, by the fourth open-loop nominal controller, a nominal body torque signal; and
determining the steering angle command signal as a sum of the body torque control signal and the nominal body torque signal.

8. The method of claim 1 further comprising:
defining the guidance trajectory as a trajectory that leads from a current position of the car-like ground vehicle to a target on a mission trajectory within a domain of attraction of the guidance controller; and
determining the position command signal based on the position of the target relative to the current position of the car-like ground vehicle.

9. The method of claim 8 wherein determining the position command signal includes:
receiving a target relative position signal;
determining, based on the target relative position signal, a range distance vector from the car-like ground vehicle to the target, the range distance vector defining a distance and a b-frame line-of-sight angle between the car-like ground vehicle and the target;
receiving a sensed yaw angle;
determining a longitudinal component of the range distance vector based on the b-frame line-of-sight angle;
determining a guidance angle based on the b-frame line-of-sight angle and the sensed yaw angle;
determining a guidance velocity in the b-frame based on the longitudinal component of the range distance vector; and
generating the position command signal in an n-frame based on the guidance angle and the guidance velocity.

10. A controller for automatically guiding and controlling a car-like ground vehicle, the controller comprising:
one or more processors; and
a memory in communication with the one or more processors and storing program code that, when executed by at least one of the one or more processors, causes the controller to:
receive a position command signal indicative of a guidance trajectory for the car-like ground vehicle;
receive a position measurement signal indicative of a position of the car-like ground vehicle;
determine a nominal velocity signal based on the position command signal;
determine a velocity control signal based on a difference between the position command signal and the position measurement signal;
determine a velocity command signal based on the nominal velocity signal and the velocity control signal;
determine a drive command signal based on the velocity command signal; and
transmit the drive command signal to a drive actuator of the car-like ground vehicle.

11. The controller of claim 10 wherein the velocity control signal includes a lateral velocity control signal and the program code further causes the controller to:
determine a yaw control signal based on a longitudinal component of the nominal velocity signal and the lateral velocity control signal; and
transmit the yaw control signal to a steering controller.

12. The controller of claim 10 wherein the velocity command signal includes a longitudinal velocity command signal, and the program code causes the controller to determine the drive command signal by:

determining the difference between a longitudinal velocity measurement signal and the longitudinal velocity command signal to generate a longitudinal velocity error signal;
determining a longitudinal force control signal based on the longitudinal velocity error signal; and
determining the drive command signal based on the longitudinal force control signal.

13. The controller of claim 12 wherein the program code causes the controller to determine the drive command signal by:
determining a nominal force signal; and
determining the drive command signal based on the nominal force signal and a tire traction force model.

14. The controller of claim 13 wherein the program code further causes the controller to:
determine a nominal drive signal based on the nominal force signal;
determine a nominal yaw signal based on the nominal force signal;
determine a nominal yaw angular rate signal based on the nominal yaw signal; and
determine a steering angle command signal based on the nominal yaw angular rate signal.

15. The controller of claim 14 wherein the program code further causes the controller to:
determine a yaw angular rate control signal based on a yaw tracking error signal; and
determine the steering angle command signal based on the yaw angular rate control signal.

16. The controller of claim 15 wherein the program code causes the controller to determine the steering angle command signal by:
receiving a yaw angular rate measurement signal;
determining a yaw angular rate command signal based on the difference between the nominal yaw angular rate signal and the yaw angular rate control signal;
determining a yaw angular rate error signal based on the difference between the yaw angular rate command signal and the yaw angular rate measurement signal;
determining a body torque control signal based on the yaw angular rate error signal;
determining a nominal body torque signal; and
determining the steering angle command signal as a sum of the body torque control signal and the nominal body torque signal.

17. The controller of claim 10 wherein the program code further causes the controller to:
define the guidance trajectory as a trajectory that leads from a current position of the car-like ground vehicle to a target on a mission trajectory within a domain of attraction of the controller; and
determine the position command signal based on the position of the target relative to the current position of the car-like ground vehicle.

18. The controller of claim 17 wherein the program code causes the controller to determine the position command signal by:
receiving a target relative position signal;
determining, based on the target relative position signal, a range distance vector from the car-like ground vehicle to the target, the range distance vector defining a distance and a b-frame line-of-sight angle between the car-like ground vehicle and the target;
receiving a sensed yaw angle;
determining a longitudinal component of the range distance vector based on the b-frame line-of-sight angle;

determining a guidance angle based on the b-frame line-of-sight angle and the sensed yaw angle;

determining a guidance velocity in the b-frame based on the longitudinal component of the range distance vector; and generating the position command signal in an n-frame based on the guidance angle and the guidance velocity.

19. A computer program product for automatically guiding and controlling a car-like ground vehicle, the computer program product comprising:

a non-transitory computer readable storage medium containing program code that, when executed by one or more processors, causes the one or more processors to:

receive a position command signal indicative of a guidance trajectory for the car-like ground vehicle;

receive a position measurement signal indicative of a position of the car-like ground vehicle;

determine a nominal velocity signal based on the position command signal;

determine a velocity control signal based on a difference between the position command signal and the position measurement signal;

determine a velocity command signal based on the nominal velocity signal and the velocity control signal;

determine a drive command signal based on the velocity command signal; and transmit the drive command signal to a drive actuator of the car-like ground vehicle.

* * * * *